United States Patent [19]
Shirochi

[11] Patent Number: 5,689,283
[45] Date of Patent: Nov. 18, 1997

[54] DISPLAY FOR MOSAIC PATTERN OF PIXEL INFORMATION WITH OPTICAL PIXEL SHIFT FOR HIGH RESOLUTION

[75] Inventor: Yoshiki Shirochi, Chiba, Japan

[73] Assignee: Sony Corporation, Tokyo, Japan

[21] Appl. No.: 502,583

[22] Filed: Jul. 14, 1995

Related U.S. Application Data

[63] Continuation of Ser. No. 177,553, Jan. 5, 1994, abandoned.

[30] Foreign Application Priority Data

| Jan. 7, 1993 | [JP] | Japan | 5-016955 |
| Jan. 14, 1993 | [JP] | Japan | 5-196973 |

[51] Int. Cl.$^6$ ............................. G09G 3/02
[52] U.S. Cl. ............... 345/132; 345/213; 345/88; 359/468
[58] Field of Search ............... 359/468, 495, 359/303, 497; 348/767, 57, 196, 219, 447; 345/100, 79, 54, 56, 32, 213, 204, 132, 149, 88

[56] References Cited

U.S. PATENT DOCUMENTS

| 2,665,335 | 1/1954 | Cahen | 348/57 |
| 3,256,385 | 6/1966 | Miller | 348/196 |
| 4,272,787 | 6/1981 | Michael | 348/447 |
| 4,612,581 | 9/1986 | Endo | 348/219 |
| 4,624,539 | 11/1986 | King et al. | 359/872 |
| 4,910,413 | 3/1990 | Tamune | 348/264 |
| 5,311,217 | 5/1994 | Guerin et al. | 347/46 |
| 5,422,658 | 6/1995 | Kawaguchi et al. | 345/213 |

FOREIGN PATENT DOCUMENTS

| 370471 | 5/1990 | European Pat. Off. . |
| 0469575 | 2/1992 | European Pat. Off. . |
| 0475670 | 3/1992 | European Pat. Off. . |
| 2611389 | 9/1988 | France . |
| WO90/05424 | 5/1990 | WIPO . |

OTHER PUBLICATIONS

Archer, "Semiconductor Replacement Guide" 1980 Ed. p. 34.

Patent Abstract from Japan, vol. 17, No. 33 (P-1473) Aug. 9, 1992, JP-A-42 53 088 (Komatsuzaki).

Patent Abstract of Japan, vol. 12, No. 44 (E-581) Aug. 27, 1987, JP-A-62 194 788 (Nakamura).

Patent Abstrat of Japan, vol. 15, No. 234 (P-1215) Mar. 26, 1991, JP-A-30 71 186 (Marushita).

Patent Abstract of Japan, vol. 13, No. 126 (E-734) Nov. 30, 1988, JP-A-63 292 880 (Muro).

Patent Abstract of Japan, vol. 16, No. 45 (E-1162) Nov. 11, 1991, JP-A-03 248 690 (Sasaki).

Patent Abstract of Japan, vol. 9, No. 106 (E-313) Dec. 24, 1984, JP-A-59 230 383 (Tsuruishi).

Patent Abstracts of Japan, vol. 10, No. 79, "Solid State Image Pickup Device", JP 60-233,388, Nov. 7, 1985.

Patent Abstracts of Japan, vol. 10, No. 356, "Picture Image Processing Method", JP61-154,289, Jul. 12, 1986.

Patent Abstracts of Japan, vol. 14, No. 2, "Picture Information Processor", JP 01-251,962, Oct. 6, 1989.

*Primary Examiner*—Richard Hjerpe
*Assistant Examiner*—Lun-Yi Lao
*Attorney, Agent, or Firm*—Jay H. Maioli

[57] ABSTRACT

The apparent resolution of an image displayed on an image display system is increased without increasing the number of actual pixels which are arranged in horizontal rows and vertical columns and selectively energizable to display an image composed of a plurality of pixel patterns in alternate fields. An optical path changer is positioned between the image display system and a viewer or screen for shifting an optical path therebetween to optically shift the pixel pattern. The optical path changer is operated to shift the optical path, and the pixel pattern to be optically shifted is displayed on the image display system in every field in synchronism with the shifting of the optical path by the optical path changer.

10 Claims, 27 Drawing Sheets

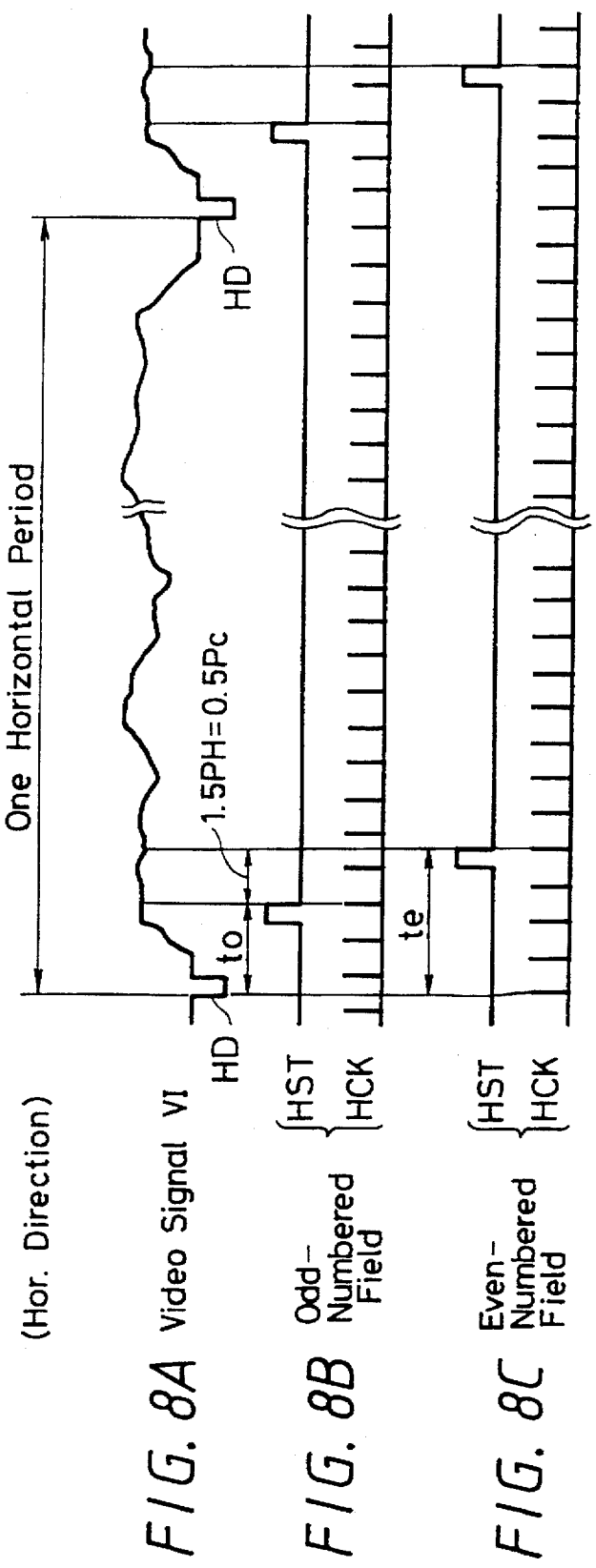

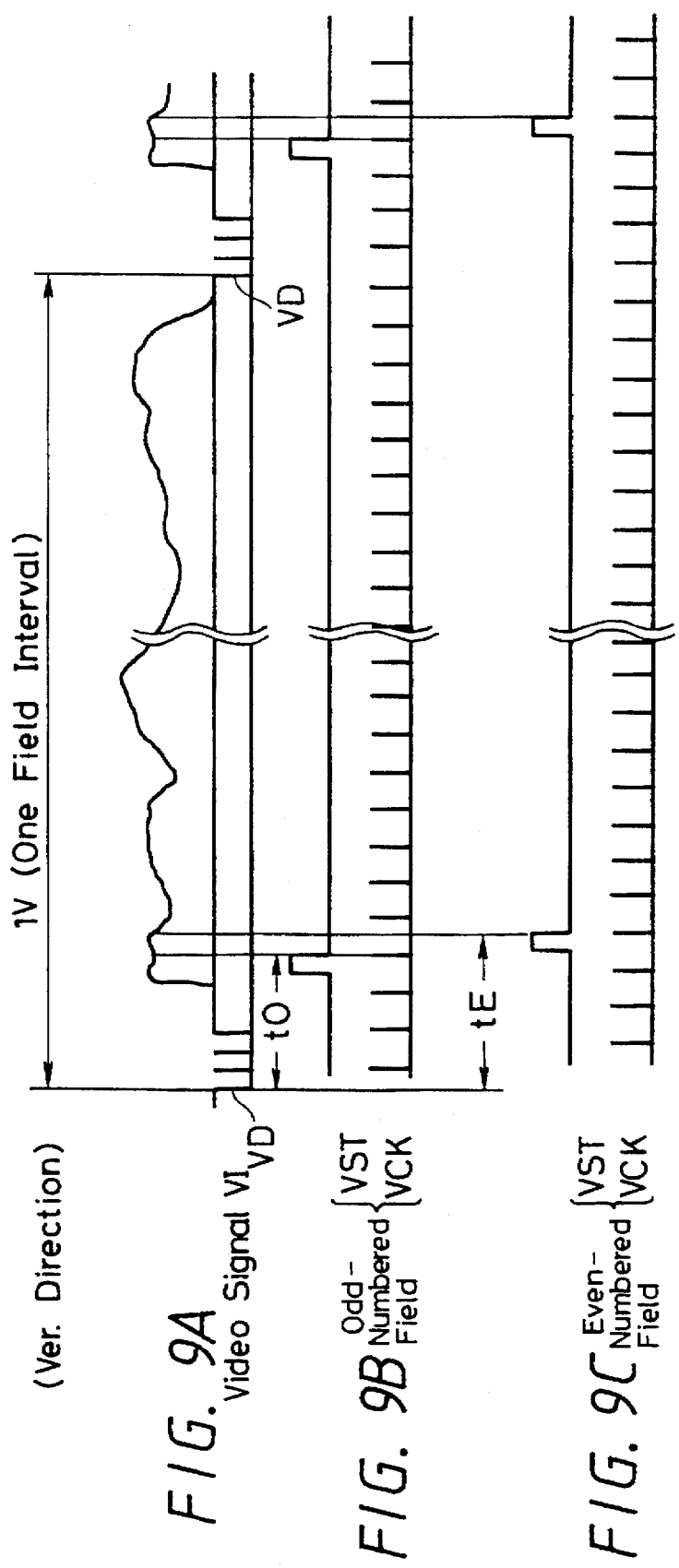

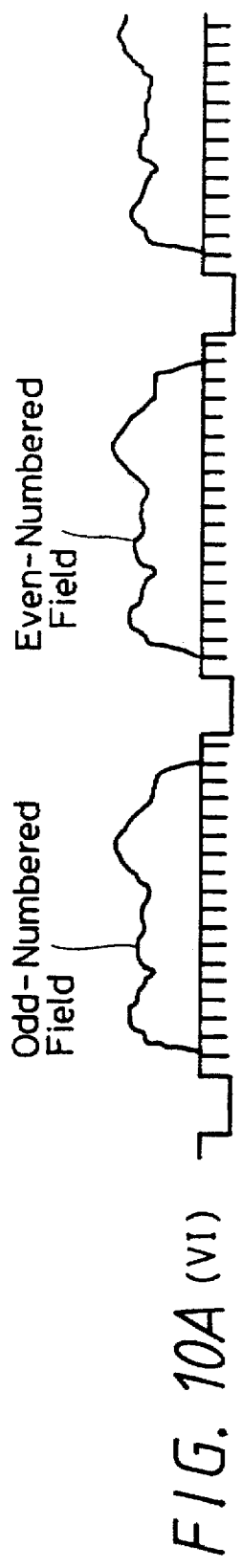
FIG. 10A (VI)
FIG. 10B (O/E)
FIG. 10C (S46)
FIG. 10D (S46)

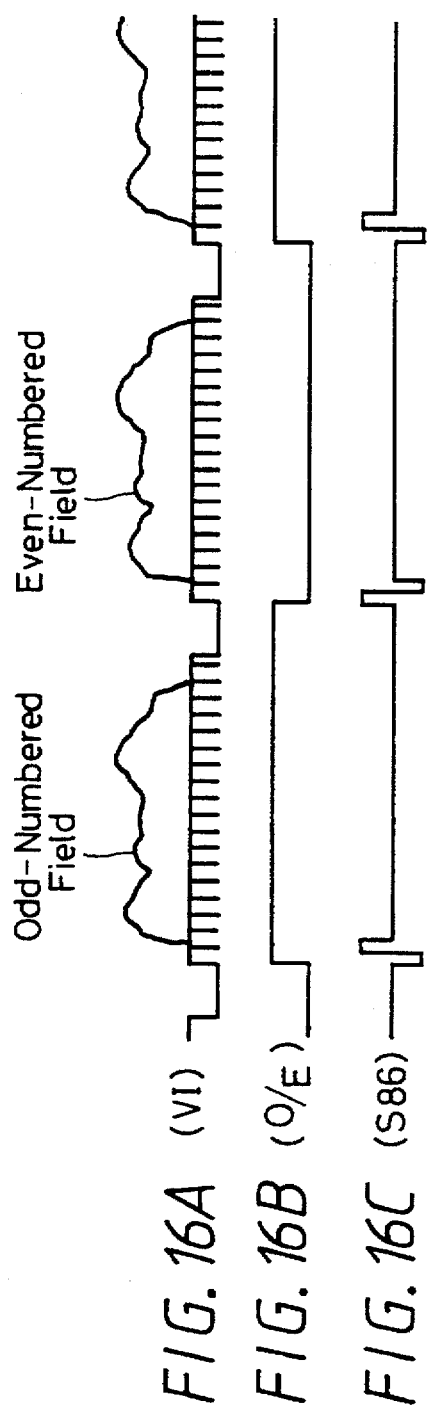
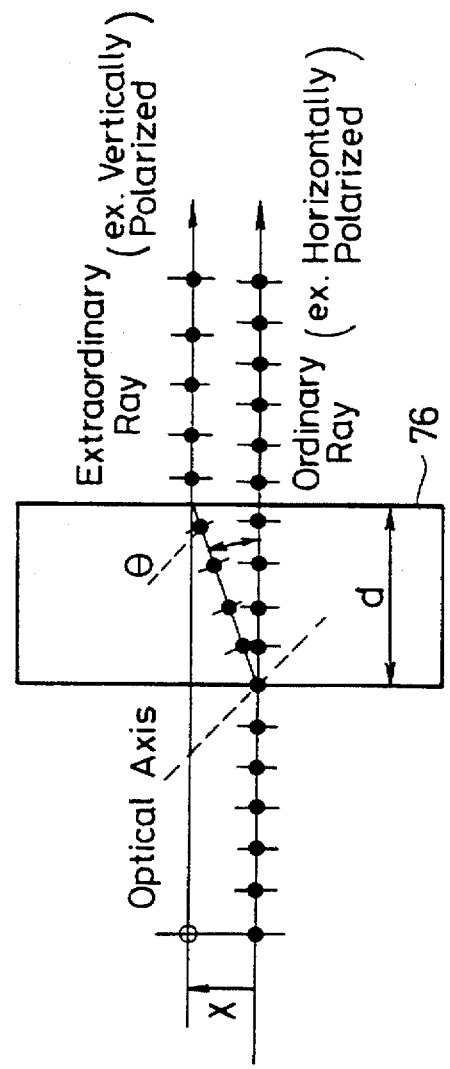

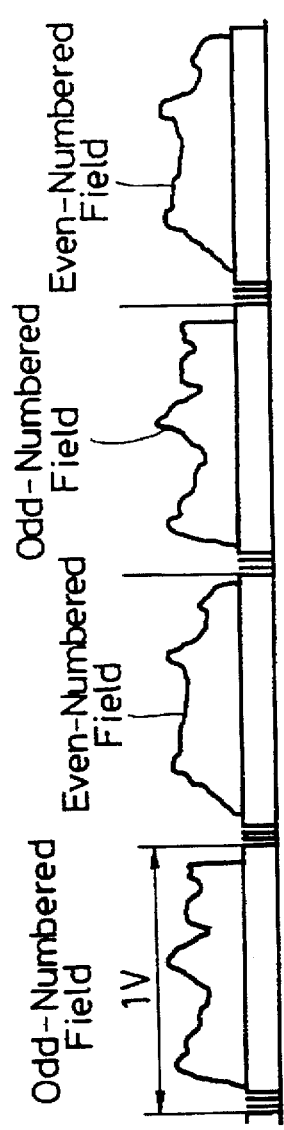
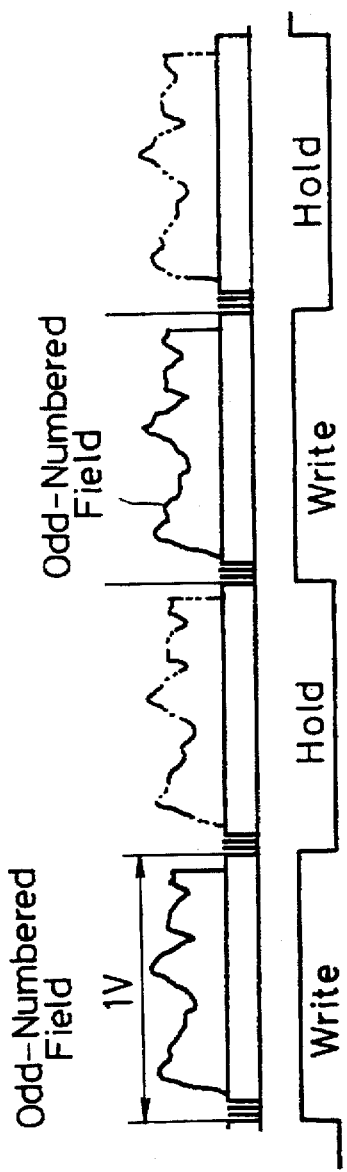
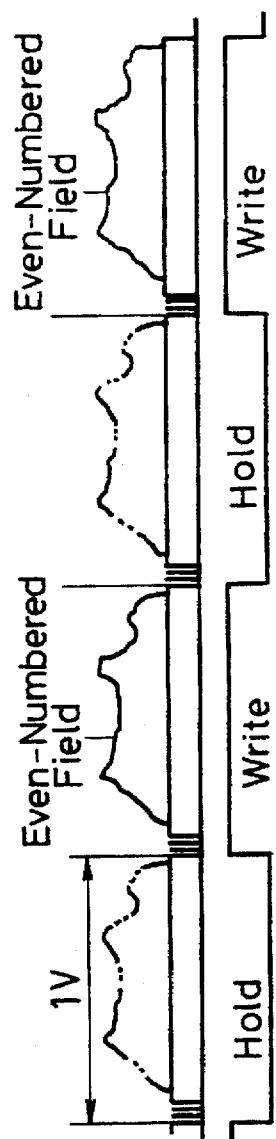
FIG. 25A Video Signal VI
FIG. 25B Projector 111
FIG. 25C Projector 112

DISPLAY FOR MOSAIC PATTERN OF PIXEL INFORMATION WITH OPTICAL PIXEL SHIFT FOR HIGH RESOLUTION

This is a continuation of application Ser. No. 08/177,553 filed Jan. 5, 1994, now abandoned.

BACKGROUND OF THE INVENTION

1. Field of the Invention

The present invention relates to an image display system such as a liquid crystal display (LCD) system for displaying image information with a three-dimensional matrix of pixels arranged in horizontal rows and vertical columns, and more particularly to a method of and an apparatus for increasing the apparent number of pixels to improve the resolution of displayed images in such an image display system, and an imaging apparatus which is capable of increasing the apparent number of pixels to improve the resolution of images produced thereby.

2. Description of the Prior Art

There has been known an image display system such as an LCD system for displaying image information with a three-dimensional matrix of pixels arranged in horizontal rows and vertical columns.

For displaying color images on such an image display system, a horizontally repeated pattern of vertical stripe filters of three primaries, i.e., red, green, and blue, is placed over the matrix of pixels, with each vertical stripe filter being aligned with one vertical column of pixels. However, since one vertical stripe filter of a certain primary exists in every three vertical columns of pixels, the color images displayed on the image display system suffer a loss of horizontal resolution.

To solve the above problem, it has been customary to shift every other horizontal row of pixels horizontally by ½ of the horizontal pitch of pixels and also to shift pixels associated with the same primaries in every other horizontal row of pixels horizontally by ½ of the horizontal pitch of those pixels which are associated with the same primaries. The pixels thus arranged are combined with a staggered pattern of filters of primaries.

Usually, the conventional image display system displays an image according to an interlaced scanning process in which an image pattern of an odd-numbered field and an image pattern of an even-numbered field are successively displayed on the same pixels, so that the image can be displayed with a small number of pixels.

The interlaced scanning process effected on the conventional image display system has a problem in that it fails to achieve a sufficient level of revolution.

Displaying an image on the image display system according to a noninterlaced scanning process requires that the number of pixels in the vertical direction be twice that which is necessary for the interlaced scanning process. However, if the number of pixels is increased for higher resolution in an image display system that is composed of a cluster of pixels, then the vignetting factor of the image display system is lowered, and dot defects are produced resulting in a lower yield and a higher cost. The noninterlaced scanning process also requires a memory for storing one horizontal line or field of image information, and makes the arrangement for driving the image display system more complex.

OBJECTS AND SUMMARY OF THE INVENTION

It is therefore an object of the present invention to provide a method of and an apparatus for optically increasing the apparent number of pixels to improve the resolution of displayed images, without actually increasing the number of pixels used.

Another object of the present invention is to provide an imaging apparatus which is capable of optically increasing the apparent number of pixels to improve the resolution of images produced thereby.

According to the present invention, there is provided a method of increasing the resolution of an image on an image display system having a matrix of pixels arranged in horizontal rows and vertical columns and selectively energizable to display an image composed of a plurality of pixel patterns in alternate fields, comprising the steps of positioning an optical path changer between the image display system and a viewer or screen to optically shift a pixel pattern, operating the optical path changer to shift the optical path, and displaying the pixel pattern to be optically shifted on the image display system in every field in synchronism with the shifting of the optical path by the optical path changer.

When the optical path is changed or shifted vertically in every field, for example, image information of odd-numbered fields and image information of even-numbered fields are displayed on the image display system in timed relation to the changing of the optical path. Since the optical path is vertically shifted, the pixel positions in the odd-numbered fields and the pixel positions in the even-numbered fields are apparently displaced from each other, resulting in a displayed image according to the noninterlaced scanning. Stated otherwise, the viewer can view the displayed image with greater resolution since the number of pixels is apparently doubled in the vertical direction.

The optical path can also be changed or shifted horizontally. When the optical path is horizontally shifted in every field and pixel patterns are shifted horizontally are displayed in timed relation to the horizontal changing of the optical path, the number of pixels can also be apparently increased in the horizontal direction.

According to the present invention, there is also provided an image display system comprising an image display device having a matrix of pixels arranged in horizontal rows and vertical columns and selectively energizable to display an image composed of a plurality of pixel patterns in alternate fields, an optical path changer disposed between the image display device and a viewer or screen for shifting an optical path therebetween to optically shift pixel patterns, and shifting means for shifting pixel patterns displayed on the image display device in timed relation to the change of the optical path by the optical path changer.

According to the present invention, there is further provided a method of increasing the resolution of an image on an image display system having a pair of projectors each having a liquid-crystal display device having a matrix of pixels for displaying an image in an interlaced scanned process and means for projecting the displayed image onto a screen, comprising the steps of controlling one of the projectors to display only odd-numbered fields of image information on the screen, controlling the other of the projectors to display only even-numbered fields of image information on the screen, and shifting respective images projected onto the screen by the projectors vertically from each other by ½ of the pitch of the pixels.

According to the present invention, there is also provided a method of increasing the resolution of an image on an image display system having a matrix of pixels arranged in horizontal rows and vertical columns and selectively energizable to display an image composed of a plurality of pixel patterns in alternate fields, the pixels being capable of continuously displaying the image until next image frame is supplied to the pixels, comprising the steps of positioning an optical path changer between the image display system and a viewer or screen for shifting optical path therebetween depending on the pixel pattern to be displayed in synchronism with vertical scanning on the image display system, operating the optical path changer to shift the optical path, and displaying the pixel pattern to be optically shifted on the image display system in every field in synchronism with the shifting of the optical path by the optical path changer.

According to the present invention, there is further provided an imaging apparatus comprising an imaging unit having a matrix of pixels for producing an image signal from all the pixels in every field in a noninterlaced scanning process, an optical path changer disposed between the imaging unit and a subject to be imaged by the imaging unit to shift the optical path therebetween, and actuator means for actuating the optical path changer to shift the optical path in a predetermined direction in every field or frame in response to a shock applied to the imaging unit, whereby the image signal generated by the imaging unit is not degraded by the shock.

According to the present invention, there is also provided a recording apparatus comprising an imaging unit, an optical path changer disposed between the imaging unit and a subject to be imaged by the imaging unit to shift an optical path therebetween a means for controlling the optical path changer to shift the optical path in every field or frame, and means for recording, on a recording medium, a plurality of field images of the subject whose optical paths are shifted by the optical path changer and have different spatially sampled positions, together with information representative of a quantity by and a direction in which each of the field images is shifted.

According to the present invention, there is further provided a reproducing apparatus for playing back the recording medium which has been recorded by the above recording apparatus, comprising means for extracting the field images and the information representative of a quantity by and a direction in which each of the field images is shifted, from a reproduced signal supplied from the recording medium, and means for shifting the extracted field images vertically and horizontally based on the extracted information and combining the shifted field images into a still image of high resolution.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 8A through 8C are timing charts illustrative of the manner in which a displayed image is horizontally shifted;

FIGS. 9A through 9C are timing charts illustrative of the manner in which a displayed image is vertically shifted;

FIGS. 10A through 10D are timing charts illustrative of the changing of an optical path by way of example;

FIGS. 16A through 16C are timing charts illustrative of the changing of an optical path in the apparatus shown in FIG. 15;

FIG. 18 is a diagram showing another optical path changer for use in the apparatus shown in FIG. 15;

FIGS. 25A through 25C are timing charts showing the manner in which the apparatus shown in FIG. 24 operates;

DETAILED DESCRIPTION OF THE PREFERRED EMBODIMENTS

First, methods of increasing image resolution according to the present invention will be described below.

FIGS. 1A through 1C and 3A through 3C show staggered patterns of three-primary pixels, which are actually composed pixels and filters of three primaries of red (R), green (G), and blue (B) are disposed in front of the pixels, for use in a color image display system.

Figure 1A:
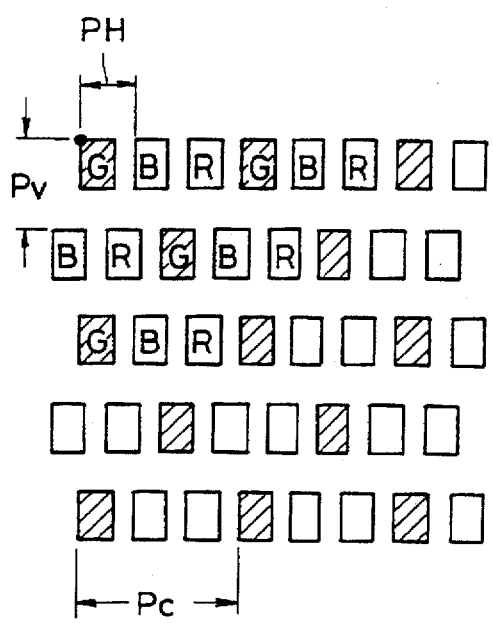
FIGS. 1A through 1C are views showing pixel patterns and an optically combined pixel pattern according to an embodiment of the present invention.
Figure 1B:
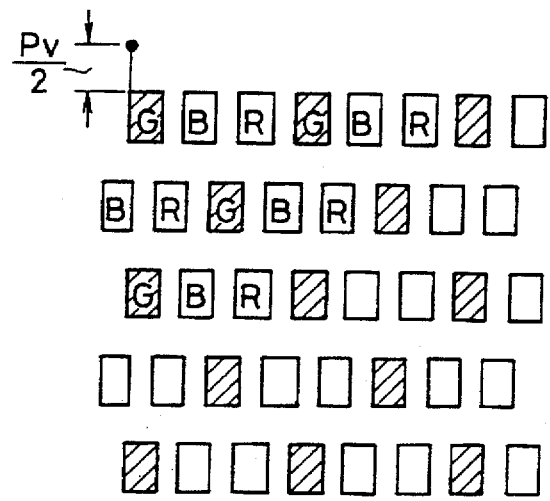
Figure 1C:
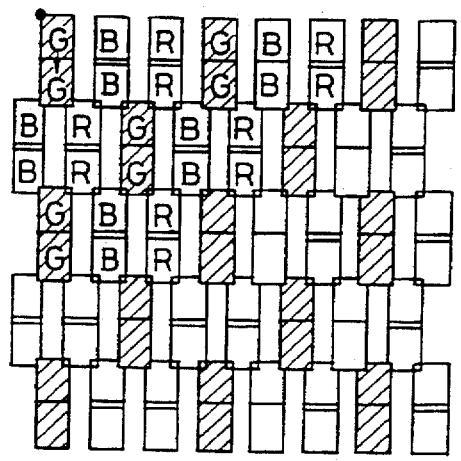

In FIGS. 1A through 1C, the positions of displayed pixels are optically shifted vertically for allowing the viewer of an image produced by the pixels to see the image as if the pixels were present in the optically shifted positions, and when image is displayed on the color image display system.

More specifically, FIG. 1A shows a color pixel pattern which comprises a staggered matrix of three-primary pixels that is not optically shifted in any direction. The pixels are spaced horizontally by a pitch PH and vertically by a pitch Pv. FIG. 1B shows a color pixel pattern which also comprises a staggered matrix of three-primary pixels that is optically shifted vertically downwardly from the color pixel pattern shown in FIG. 1A by ½ of the vertical pitch Pv as seen by the viewer. The color pixel pattern shown in FIG. 1B is optically shifted by an optical path changer (described later on).

The color pixel pattern shown in FIG. 1A is supplied with image information VA composed of pixel information at the pixel positions shown in FIG. 1A. Similarly, the color pixel pattern shown in FIG. 1B is supplied with image information VB composed of pixel information at the pixel positions shown in FIG. 1B.

The image information signals VA, VB contain respective pixel information at the pixel positions that are vertically shifted Pv/2 from each other with respect to an image that is to be displayed.

The optical path changer is controlled such that the color pixel patterns shown in FIGS. 1A and 1B which are optionally vertically shifted Pv/2 from each other will visually be observed as alternating fields by the viewer.

In timed relation to the changing of an optical path by the optical path changer, the image information signal VA, VB is switched each field and supplied to the color image display system, i.e., the image information VA is supplied in one field and the image information VB is supplied in the next field to the color image display system, so that the color pixel patterns shown in FIGS. 1A and 1B will be displayed alternately in respective fields.

As a result, the viewer visually observes, on the color image display system, an optically combined color image that is represented by an optically combined pixel pattern shown in FIG. 1C. Therefore, the color image display system apparently displays a color image with a resolution which is substantially the same as a color image display system having twice as many pixels as the display device.

If the original image information to be displayed is represented by an interlaced-scanning television signal, then since odd- and even-numbered field signals indicate pixel information at positions that are Pv/2 shifted from each other, the odd- and even-numbered field signals directly represent the image information signals VA, VB, respectively, and hence can be supplied to the color image display system in the same manner as heretofore.

Figure 2A:
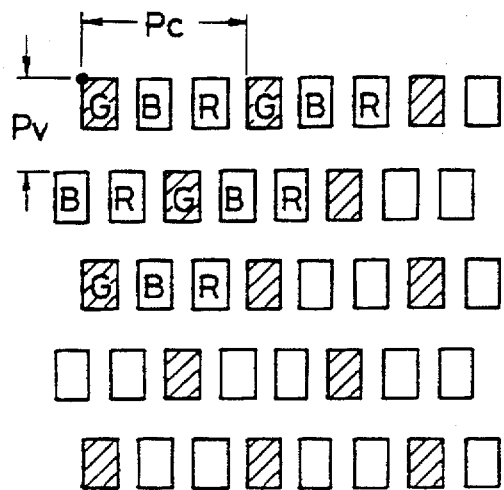
FIGS. 2A through 2C are views showing pixel patterns and an optically combined pixel pattern according to another embodiment of the present invention.
Figure 2B:
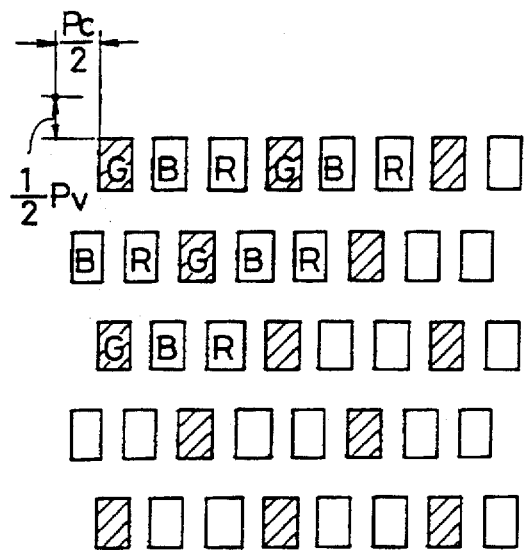
Figure 2C:
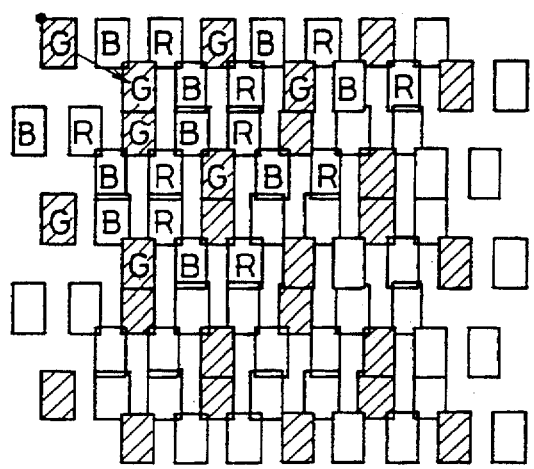

In FIGS. 2A through 2C, the positions of displayed pixels are optically shifted both vertically and horizontally. The positions of displayed pixels are optically shifted Pv/2 vertically, and Pc/2 horizontally where Pc is the pitch of pixels of the same colors in the horizontal direction.

FIG. 2A shows a color pixel pattern PTA which comprises a staggered matrix of three-primary pixels that is not optically shifted in any direction. FIG. 2B shows a color pixel pattern PTC which also comprises a staggered matrix of three-primary pixels that is optically shifted Pv/2 vertically downwardly and Pc/2 horizontally to the right from the color pixel pattern shown in FIG. 2A as seen by the viewer.

The color pixel patterns PTA, PTC are switched in alternate fields, i.e., image information signals VA, VB containing the information of pixel positions of the color pixel patterns PTA, PTC is switched in alternate fields and supplied to the color image display system for displaying an image represented by the image information signals VA, VB.

Since the displayed pixel positions are shifted also horizontally, the even-numbered fields of an interlaced-scanning television signal are horizontally scanned from a position that is PH/2 out of phase with the original horizontal synchronizing signal.

Figure 3A:
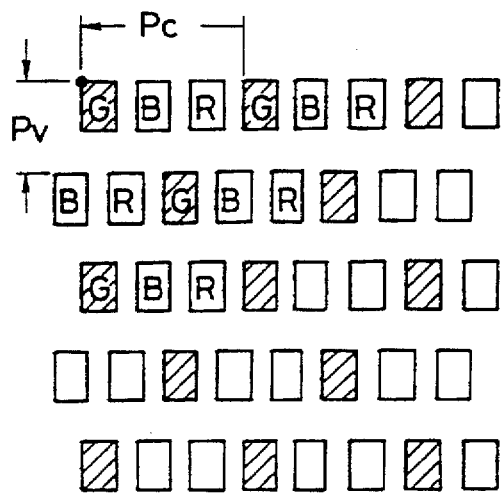
FIGS. 3A through 3C are views showing pixel patterns and an optically combined pixel pattern according to still another embodiment of the present invention.
Figure 3B:
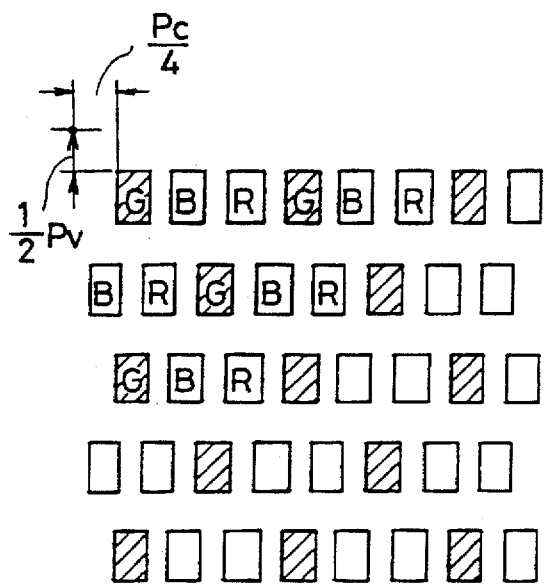
Figure 3C:
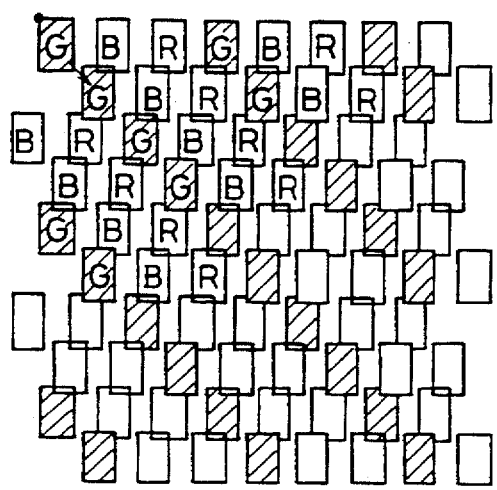

FIGS. 3A through 3C show the positions of displayed pixels which are optically shifted both vertically and horizontally. The color pixel pattern shown in FIG. 3B differs from the color pixel pattern shown in FIG. 2B in that the positions of displayed pixels are optically shifted Pv/2 vertically, and Pc/4 horizontally.

Figure 4A:
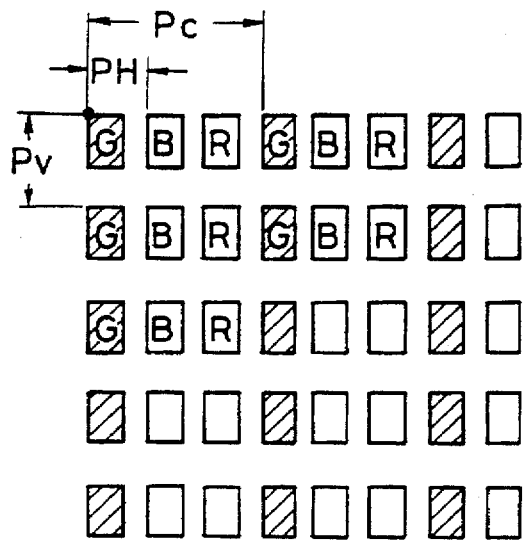
FIGS. 4A through 4C are views showing pixel patterns and an optically combined pixel pattern according to yet still another embodiment of the present invention.
Figure 4B:
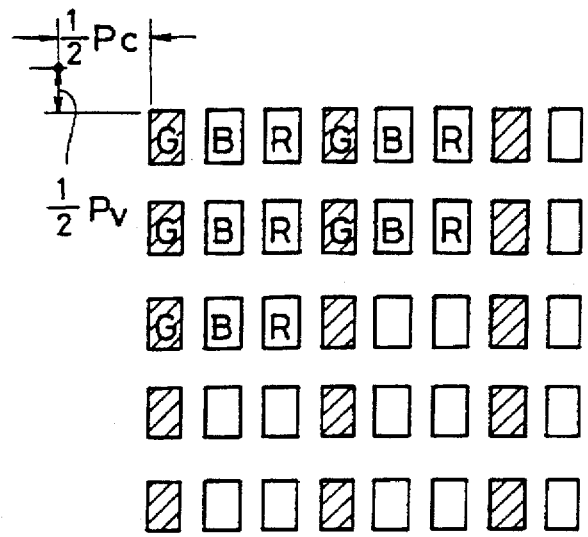
Figure 4C:
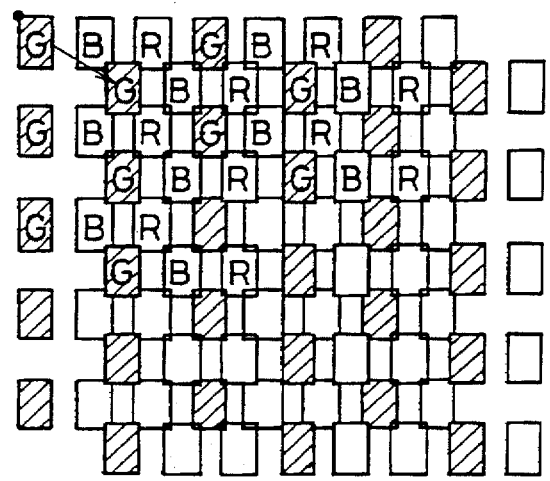

In FIGS. 4A through 4C, a color pixel pattern comprises a three-dimensional matrix of pixels arranged in horizontal rows and vertical columns and combined with stripe filters of three primaries of red (R), green (G), and blue (B). An optical path that is directed from the color pixel pattern toward the viewer is shifted Pv/2 vertically and Pc/2 horizontally.

FIG. 4A shows a color pixel pattern which comprises a matrix of three-primary pixels that is not optically shifted in any direction. FIG. 4B shows a color pixel pattern which also comprises a matrix of three-primary pixels that is optically shifted Pv/2 vertically downwardly and Pc/2 horizontally to the right from the color pixel pattern shown in FIG. 4A as seen by the viewer. FIG. 4C illustrates a combination of the color pixel patterns shown in FIGS. 4A and 4B that are switched in alternate fields.

In FIGS. 4A through 4C, the optical path is changed or shifted in every field. As with the color pixel patterns shown in FIGS. 2A through 2C, the image information containing the information for pixel positions of the color pixel patterns shown in FIGS. 4A and 4B may be vertically shifted when odd- and even-numbered field signals of an interlaced-scanning television signal are supplied to the color image display system, and may be horizontally shifted when the even-numbered fields of an interlaced-scanning television signal are horizontally scanned from a position that is PH/2 out of phase with the original horizontal synchronizing signal.

Figure 5:
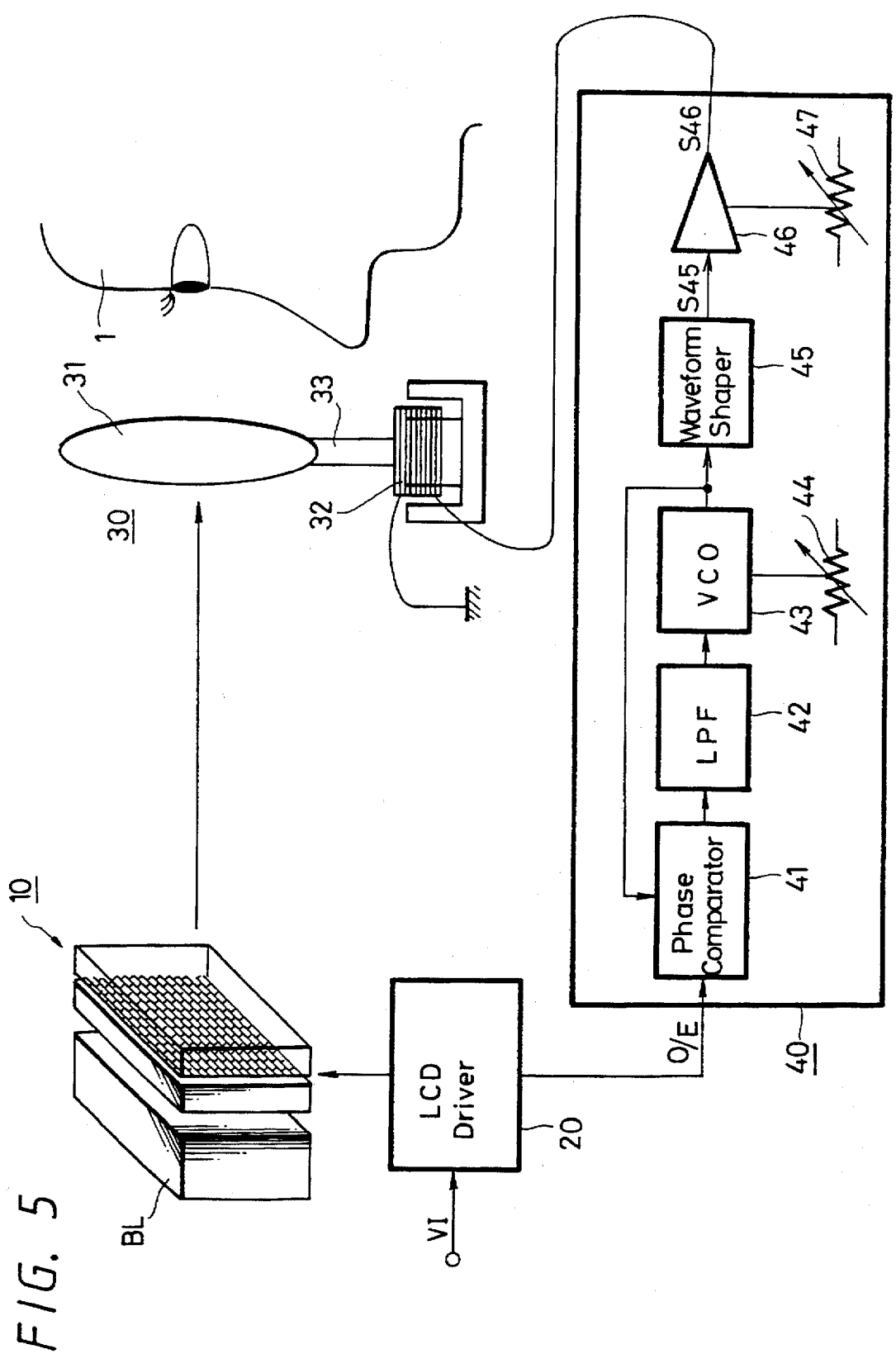
FIG. 5 is a schematic view, partly in block form, of an apparatus for increasing the resolution in an image display system according to an embodiment of the present invention.

FIG. 5 shows an apparatus for increasing the resolution in of image display system according to an embodiment of the present invention.

As shown in FIG. 5, the apparatus includes an LCD panel 10, an LCD driver 20, an eyepiece 31, an optical path changer 30, and an optical path changer driver 40. The LCD panel 10 is combined with a backlight unit BL which applies light from behind the LCD panel 10 to make an image displayed thereon sharper.

Figure 6:
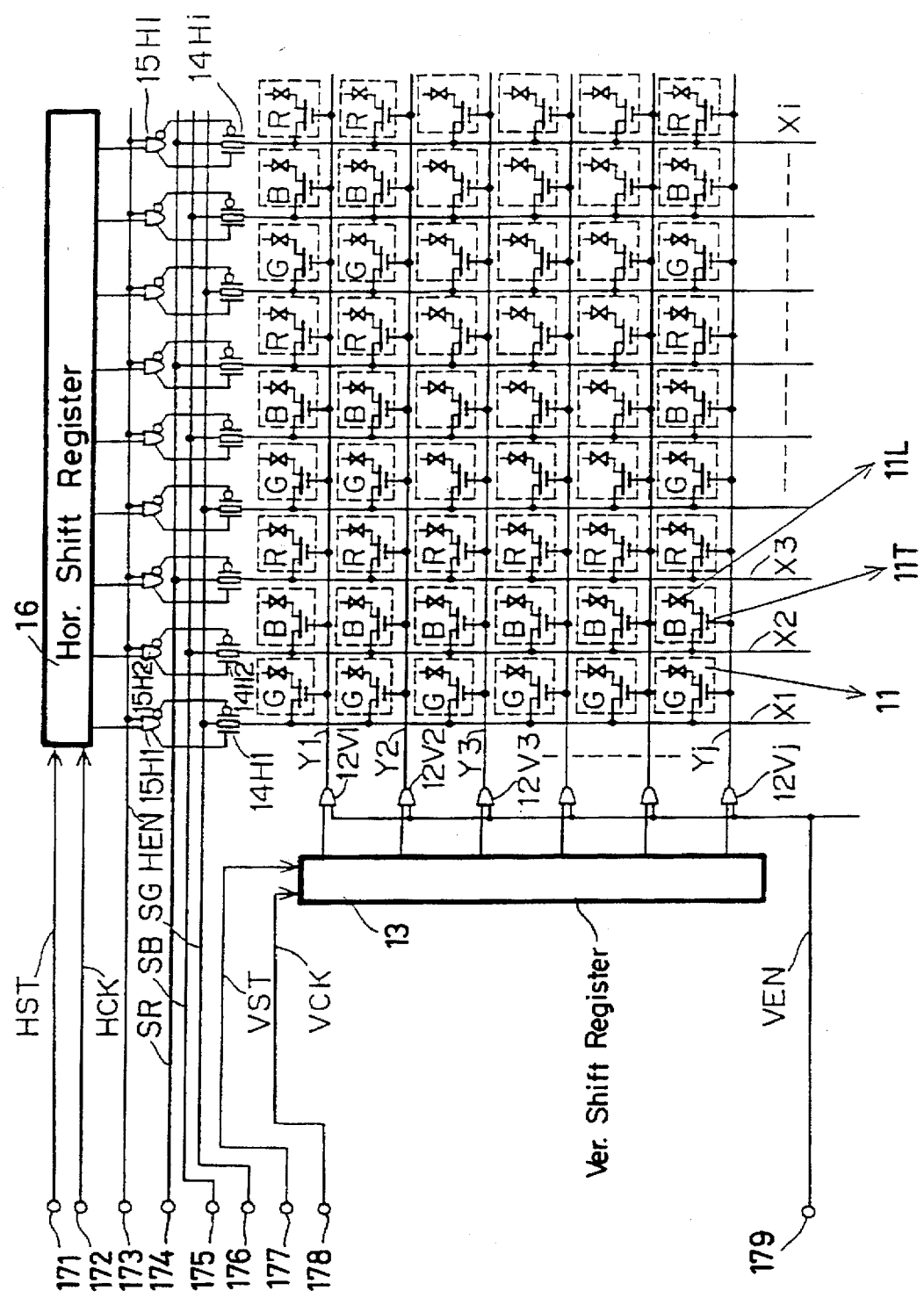
FIG. 6 is a circuit diagram of an LCD panel for use in the image display system.

As shown in FIG. 6, the LCD panel 10 comprises a matrix of pixels 11 each comprising a thin-film transistor (TFT) 11T and a liquid crystal cell 11L. The pixels 11 are arranged as shown in FIG. 4A and combined with vertical stripe filters R, G, B each aligned with a vertical column of pixels. Therefore, each vertical column of pixels is associated with one color, i.e., one of the three primaries. The LCD panel 10 thus has the arrangement of the color image display system shown in FIGS. 4A through 4C.

The gates of the thin-film transistors 11T of each horizontal row of pixels indicated by R, G, B, R, B, G, ... are connected in common to each other. The gates of the thin-film transistors 11T of the horizontal rows of pixels are connected respectively to row lines Y1, Y2, ... Yj, ... Yn.

The sources of the thin-film transistors 11t of each vertical column of pixels are connected in common to each other. The sources of the thin-film transistors 11T of the vertical columns of pixels are connected respectively to column lines X1, X2, X3, ... Xi, ... Xm.

The row lines Y1, Y2, ... Yj, ... Yn are connected to the respective output terminals of gates 12V1, 12V2, ... 12Vn, which can be enabled by a vertical enable signal VEN. The gates 12V1, 12V2, ... 12Vn have input terminals connected to respective stages of a vertical shift register 13 which effects vertical scanning.

The vertical shift register 13 is supplied with a vertical reset pulse VST and vertical clock pulses VCK. The vertical shift register 13 successively transfers "1" to effect vertical scanning in response to supplied vertical clock pulses VCK. The vertical shift register 13 is reset by the vertical reset pulse VST to determine a phase for starting vertical scanning.

The column lines X1, X2, ... Xi, ... Xm are connected respectively to signal switches 14H1, 14H2, ... 14Hi, ... 14Hm. Those signal switches which are connected to the column lines coupled to the pixel columns of green G are supplied with a green primary signal SG. Those signal switches which are connected to the column lines coupled to the pixel columns of blue B are supplied with a blue primary signal SB. Those signal switches which are connected to the column lines coupled to the pixel columns of red R are supplied with a red primary signal SR.

The signal switches 14H1, 14H2, ... 14Hi, ... 14Hm are controlled for their switching operation by respective gates 15H1, 15H2, ... 15Hi, ... 15Hm. The gates 15H1, 15H2, ... 15Hi, ... 15Hm have input terminals supplied with a horizontal enable signal HEN which controls gates 15H1~15Hm for their opening and closing. The other input terminals of the gates 15H1~15Hm are supplied with output signals from respective stages of a horizontal shift register 16.

The horizontal shift register 16 is supplied with a horizontal reset pulse HST and horizontal clock pulses HCK. The horizontal shift register 16 is energized by horizontal clock pulses HCK to scan the pixels 11 horizontally to write image information in those pixels that are selected by the vertical scanning. The state of a pixel in which image information is stored is maintained for the period of one field. The horizontal shift register 16 is reset by the horizontal reset pulse HST to determine the phase for starting horizontal scanning.

Figure 7:
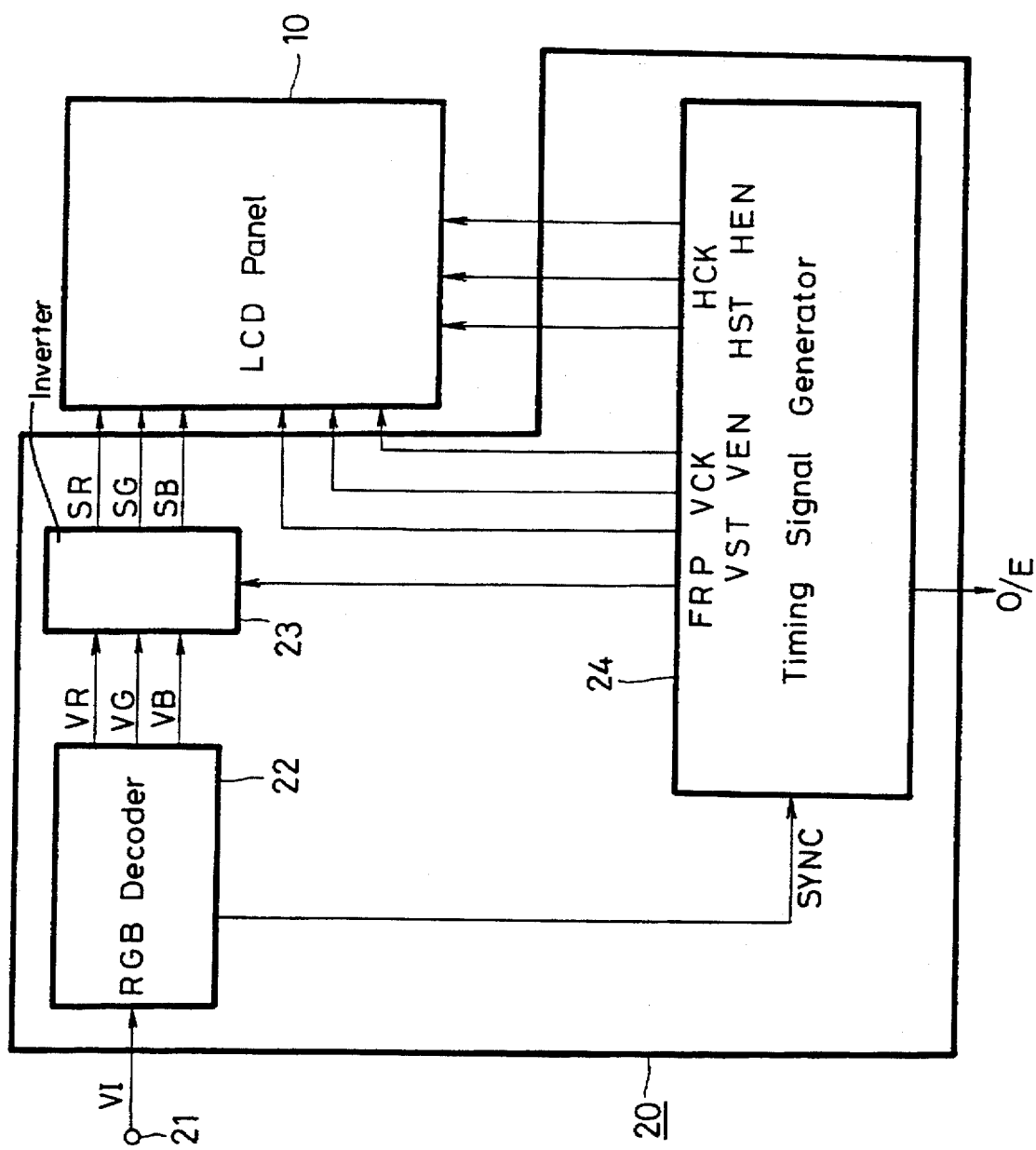
FIG. 7 is a block diagram of the image display system.

The LCD driver 20 for energizing the LCD panel 10 is illustrated in FIG. 7. In FIG. 7, an NTSC color video signal VI, for example, inputted through an input terminal 21 is supplied to an RGB decoder 22 which converts the NTSC color video signal VI into three primary signals VR, VG, VB of red, green, and blue. The three primary signals VR, BG, VB are supplied from the RGB decoder 22 to an inverter 23.

The RGB decoder 22 also extracts a composite synchronizing signal SYNC from the supplied NTSC color video signal VI, and supplies the extracted composite synchronizing signal SYNC to a timing signal generator 24. The timing signal generator 24 produces a pulse FRP that is inverted in polarity in each horizontal interval, and supplies the pulse FRP to the inverter 23, which inverts the primary signals VR, BG, VB in each horizontal scan interval for thereby canceling DC components. The inverter 23 supplies primary signals SR, SB, SB which are composed of alternate inverted and noninverted signals in respective horizontal scan intervals to respective three-primary-signal input terminals 174, 175, 176 of the LCD panel 10 shown in FIG. 6.

The timing signal generator 24 also generates the horizontal reset pulse HST, the horizontal clock pulses HCK, the horizontal enable signal HEN, the vertical reset pulse VST, the vertical clock pulses VCK, and the vertical enable signal VEN based on the composite synchronizing signal SYNC, and supplies them to respective input terminals 171, 172, 173, 177, 178, 179 of the LCD panel 10 shown in FIG. 6.

An image that is displayed on the LCD panel 10 may be shifted or displaced Pc/2 (=3PH/2 where PH is the pitch of the pixels in the horizontal direction) horizontally and Pv/2 vertically in every field.

Such image shifting is achieved by delaying the horizontal reset pulse HST and the horizontal clock pulses HCK in every field and also delaying the vertical reset pulse VST and the vertical clock pulses VCK in every field.

First, the image shifting in the horizontal direction will be described below. FIG. 8A shows the color video signal VI inputted through the input terminal 21, the color video signal VI containing a horizontal synchronizing signal HD. In an odd-numbered field, as shown in FIG. 8B, the horizontal reset pulse HST lags the horizontal synchronizing signal HD by a time to, for example, in an initial period of an effective horizontal video interval. The horizontal clock pulses HCK are pulses that repeated in cyclic periods depending on the horizontal pixel pitch PH and the horizontal scanning speed, and are reset by the horizontal reset pulse HST into synchronism with a negative-going edge, for example, of the horizontal reset pulse HST.

In an even-numbered field, as shown in FIG. 8C, the horizontal reset pulse HST lags the horizontal synchronizing signal HD by a time te. The time te is longer than the time to by 3/2 PH=Pc/2. Since the pixels of the LCD panel 10 are being horizontally scanned from the first pixel (left-hand end) in the horizontal direction from the time of the horizontal reset pulse HST, images displayed in the odd- and even-numbered fields are horizontally shifted from each other by 3/2 PH=Pc/2.

The image shifting in the horizontal direction will be described below. FIG. 9A shows one field of the color video signal VI inputted through the input terminal 21, the color video signal VI containing a vertical synchronizing signal VD.

In an odd-numbered field, as shown in FIG. 9B, the vertical reset pulse VST lags the vertical synchronizing signal VD by a time tO in an initial period of an effective vertical video interval. The vertical clock pulses VCK are pulses that repeated in cyclic periods depending on the vertical pixel pitch Pv and the vertical scanning speed, and are reset by the vertical reset pulse VST into synchronism with a negative-going edge, for example, of the vertical reset pulse VST.

In an even-numbered field, as shown in FIG. 9C, the vertical reset pulse VST lags the vertical synchronizing signal VD by a time tE. The time tE is longer than the time tO by Pv/2. Since the pixels of the LCD panel 10 are vertically scanned from the uppermost line (row line Y1) in the vertical direction from the time of the vertical reset pulse VST, images displayed in the odd- and even-numbered fields are vertically shifted from each other by Pv/2.

As described above, the odd- and even-numbered field signals of an interlaced-scanning video signal such as an NTSC color video signal are displayed in positions that are shifted Pv/2 from each other. Any signal processing required for shifting a displayed image in the vertical direction remains the same as heretofore, with the vertical reset pulse VST lagging the vertical synchronizing signal VD by a certain time because the vertical synchronizing signal VD being Pv/2 out of phase from field to field.

In the conventional image display system, images in odd- and even-numbered fields are displayed on the same pixels whose positions remain unchanged apparently. According to the present invention, as described later on, images in odd- and even-numbered fields are displayed on pixels whose positions are optically shifted by Pv/2, with the result that the apparent number of pixels is increased for an increased resolution.

In the image display system shown in FIG. 5, apparent pixel positions are shifted using the optical path changer 30. In FIG. 5, the optical path changer 30 is composed of the eyepiece 31 which comprises a convex lens and a voice coil 32. The voice coil 32, when energized, moves the eyepiece 31 linearly in a direction perpendicular to the optical axis of the eyepiece 31 reciprocally in the period of each frame for thereby changing or shifting the optical path through the eyepiece 31 to shift the apparent pixel positions. The eyepiece 31 is supported on a lens mount 33 which is vertically vibrated by the voice coil 32 to reciprocally move the eyepiece 31 linearly across the optical axis thereof.

The voice coil 32 is energized by the optical path changer driver 40. The optical path changer driver 40 is supplied with a decision signal O/E (see FIG. 10B) from the LCD driver 20 which indicates whether the present field is an odd-numbered field or an even-numbered field of the color video signal VI (see FIG. 10A). In the optical path changer driver 40, the decision signal O/E, which has a frequency of 30 Hz, is compared with a signal S43 having a frequency of 30 Hz from a variable-frequency oscillator (hereinafter referred to as a "VCO") 43 by a phase comparator 41. A phase error signal S41 outputted from the phase comparator 41 is supplied through a low-pass filter 42 to the VCO 43 to control the output signal S43 thereof into synchronism with the decision signal O/E.

To the VCO 43, there is connected a phase regulator 44 in the form of a variable resistor which adjusts the phase of the output signal S43 with respect to the decision signal O/E into proper phase relationship with the image signal of each field.

The output signal S43 from the VCO 43 is then supplied to a waveform shaper 45, which produces a rectangular signal. The amplitude of the rectangular signal from the waveform shaper 45 is adjusted by a control driver 46 that is associated with an amplitude-adjusting variable resistor 47.

The control driver 46 supplies an output signal S46 (see FIG. 10C) to the voice coil 32 for thereby energizing the voice coil 32. Specifically, when the signal S46 is at a high level, the eyepiece 31 is moved into the solid-line position in FIG. 11, and when the signal S46 is at a low level, the eyepiece 31 is moved into the dotted-line position in FIG. 11. In this manner, the optical path through the eyepiece 31 is changed or shifted synchronously with each field to cause the positions of the pixels of the LCD panel 10 to look shifted optically in the direction perpendicular to the optical axis of the eyepiece 31.

If the signal S46 is of such phase as shown in FIG. 10D, then the apparent resolution is increased most effectively in a central area of the screen of the image display system.

Figure 11:
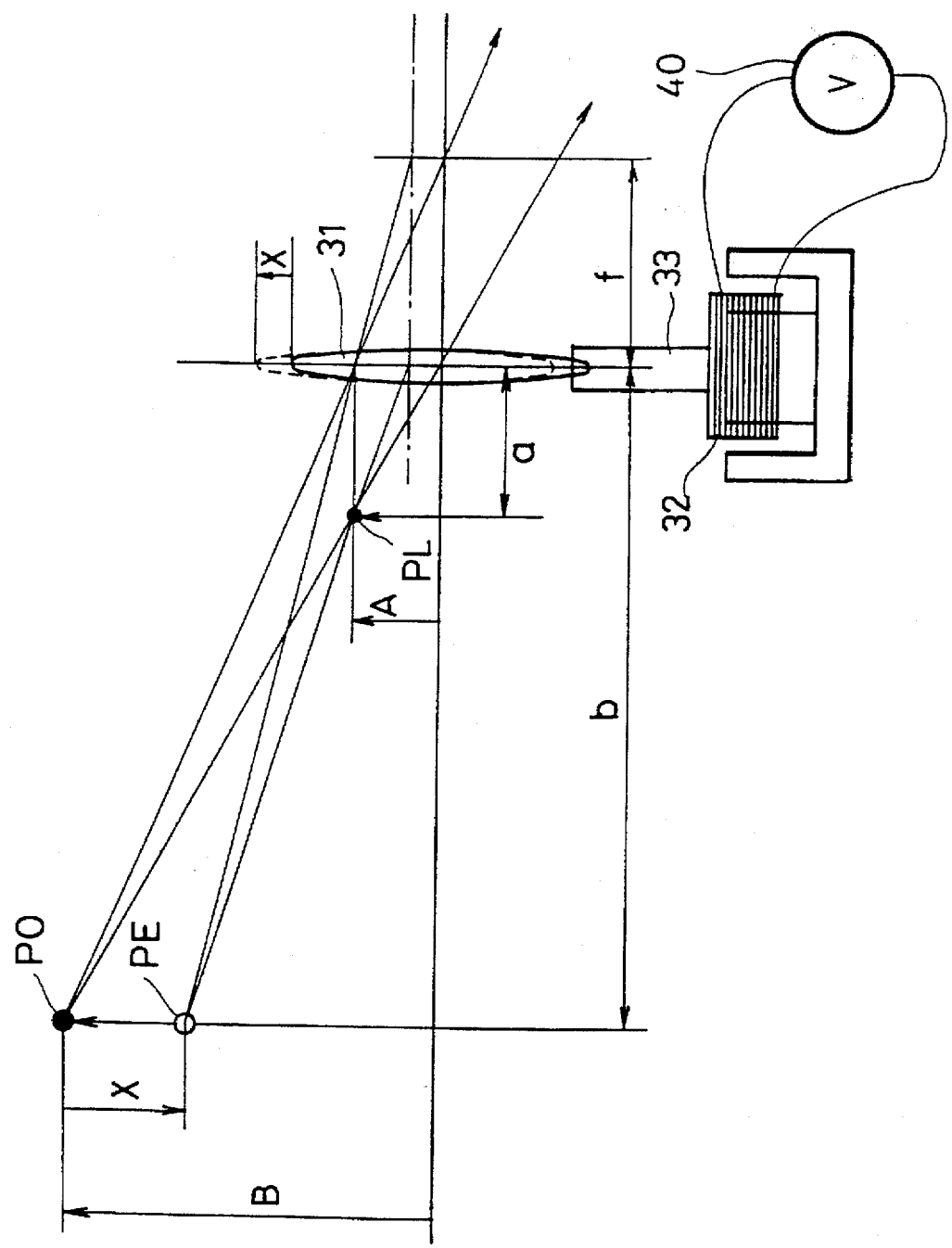
FIG. 11 is a diagram showing the principles of the changing of an optical path in the apparatus shown in FIG. 5.

FIG. 11 shows the principles of an optical shift of the pixel positions, i.e., the changing of the optical path, in the apparatus shown in FIG. 5. In FIG. 11, the eyepiece 31 has a focal length f. In the odd-numbered fields of the video signal VI in which the eyepiece 31 is in the solid-line position, the image (virtual image) of a point PL that is spaced a distance a from the eyepiece 31, i.e., a displayed image on the LCD panel 10, is focused as a point PO in a position that is spaced a distance b from the eyepiece 31.

In the even-numbered fields of the video signal VI, the eyepiece 31 is in the dotted-line position which is displaced a distance x upwardly from the solid-line position. The image of the point PL as it is observed by the viewer, denoted at 1 in FIG. 5, through the eyepiece 31 is now focused as a point PE in a position that is displaced a distance X downwardly from the point PO. Therefore, the observed image of the point PL is shifted the distance X downwardly. When the eyepiece 31 is moved perpendicularly to the optical axis, accordingly, the pixel positions appear to the viewer to be shifted, resulting in an optical shift of the pixel positions.

If a real image having a length A is assumed in place of the point PL, and an image having a length B is assumed as its virtual image, then the following equations (1) and (2) are satisfied:

$$(A-x)/(B-X-x)=a/b \qquad (1)$$

and $$A/B=a/b \qquad (2).$$

From the equations (1) and (2), the distance x is determined as follows:

$$x=X/(b/a-1) \qquad (3).$$

If the magnification K of the eyepiece 31 is K=b/a and the amount of pixel shift as converted in terms of the real image A is represented by xr, then since X=K*xr, the amount x of the lens shift is given by:

$$x=xr*K/(K-1) \qquad (4)$$

where * indicates a multiplication.

The optical pixel shift shown in FIGS. 4A through 4C can be achieved when the eyepiece 31 is shifted by the voice coil 32 in the same direction as the direction of the pixel shift. The eyepiece 31 may be combined with a voice coil which can shift the pixels in the horizontal direction of the LCD panel 10 and a voice coil which can shift the pixels in the vertical direction of the LCD panel 10, so that the pixels can optical be shifted in any desired direction under a combination of forces produced by both the voice coils.

The eyepiece 31 may be reciprocally moved linearly not only by the voice coil, but also by a mechanical device such as a piezoelectric device, a bimorph cell, a stepping motor, a solenoid-operated actuator, or the like.

The apparatus shown in FIG. 5 can easily be realized if the eyepiece 31 is small and light. Since the optical path is changed or shifted in an analog fashion for light deflection, if a reproduced or displayed image is produced by a video camera and suffers a camera shock, then the apparatus shown in FIG. 5 may be used to compensate for such a camera shock by detecting the camera shock based on a displacement of the image.

The optical pixel shift can be achieved by any of various optical path changers rather than the mechanical vibration of the eyepiece 31.

Figure 12:
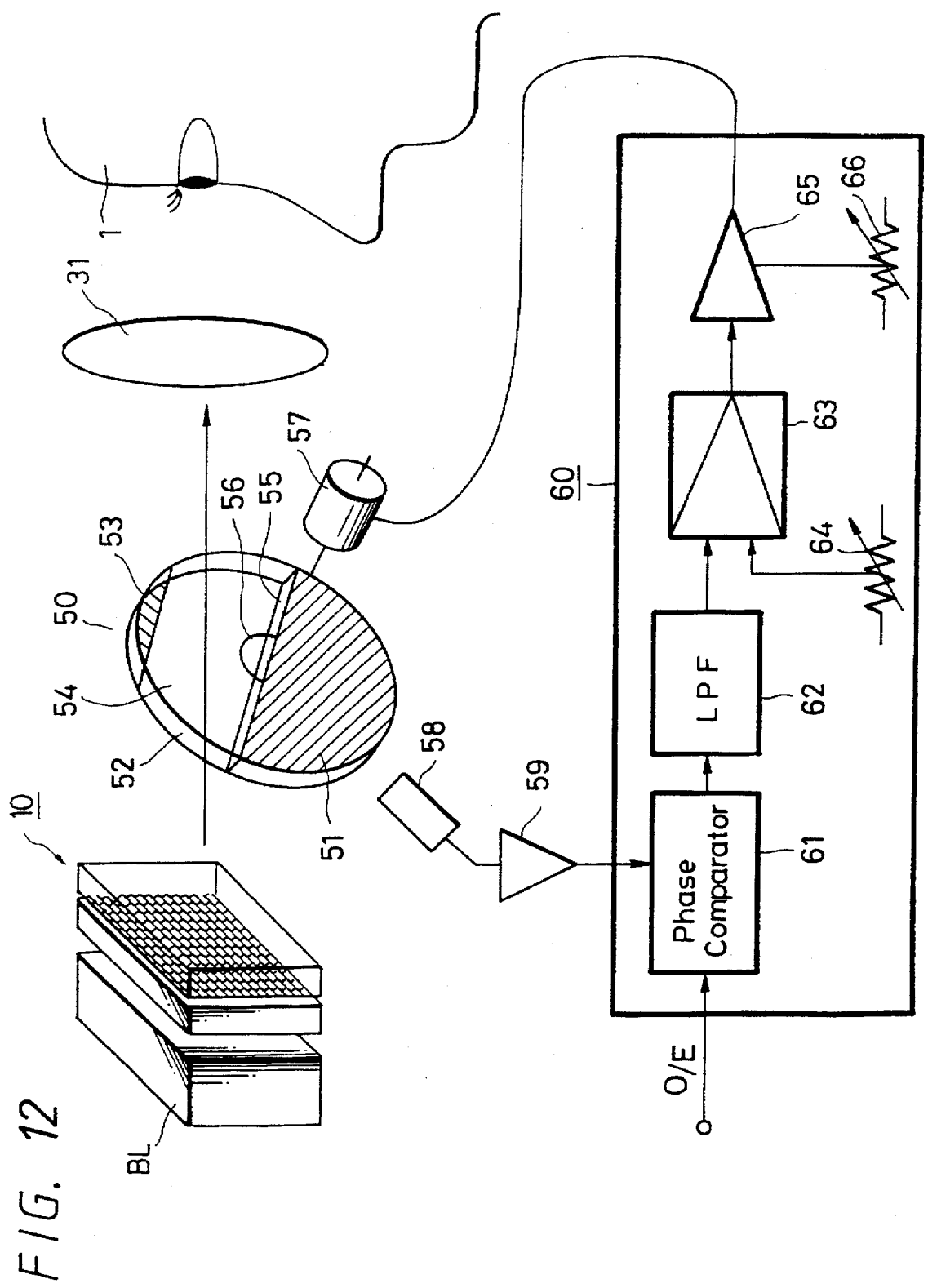
FIG. 12 is the schematic view, partly in block form, of an apparatus for increasing a resolution in an image display system according to another embodiment of the present invention.
Figure 13:
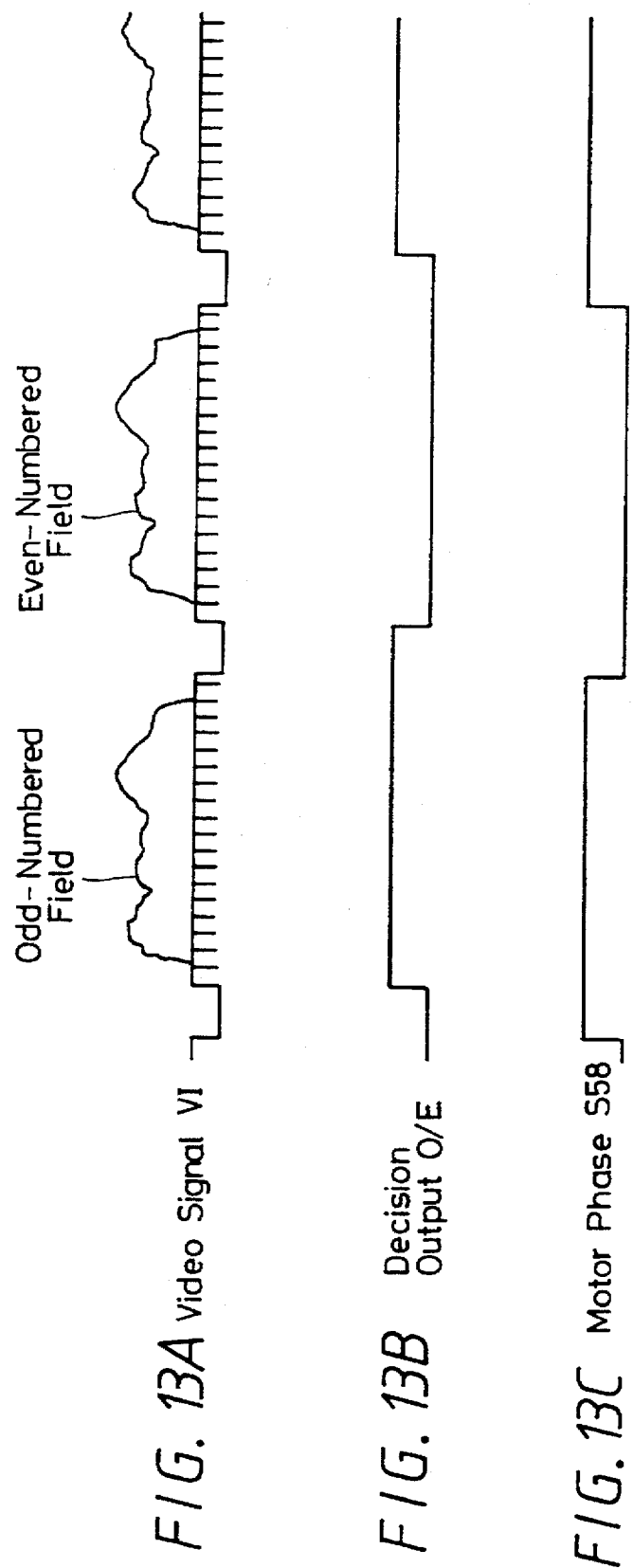
FIGS. 13A through 13C are timing charts illustrative of the changing of an optical path in the apparatus shown in FIG. 12.
Figure 14:
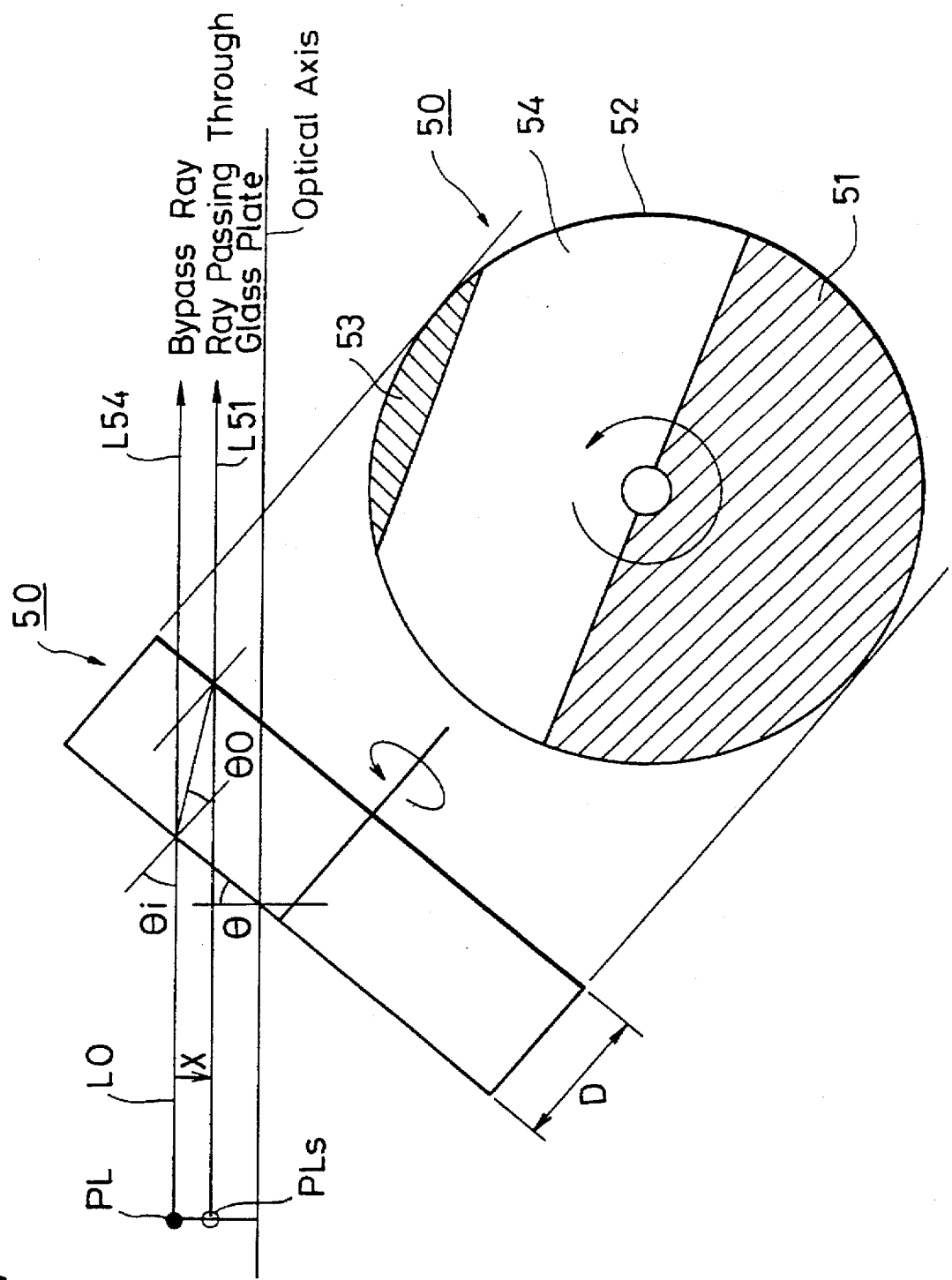
FIG. 14 is a diagram showing the principles of the changing of an optical path in the apparatus shown in FIG. 12.

FIGS. 12 through 14 show an apparatus for increasing a resolution according to another embodiment of the present invention, the apparatus including a semicircular glass plate as an optical path changer for accomplishing an optical pixel shift.

As shown in FIG. 12, the apparatus includes an optical path changer 50 disposed in an optical path between an LCD panel 10 and an eyepiece 31. The optical path changer 50 comprises a semicircular glass plate 51 supported by a rigid annular holder 52. The annular holder 52 also supports a relatively small segmental counterweight 53 having a weight counterbalancing the semicircular glass plate 51 and positioned radially opposite to the semicircular glass plate 51. A hollow bypass region 54 is defined between the semicircular glass plate 51 and the counterweight 53.

An elongate panel 55 is diametrically attached to the annular holder 52 in intimate contact with a straight side of the semicircular glass plate 51, and connected at its center to a joint 56 which is coupled to the rotatable shaft of a motor 57. Therefore, when the motor 57 is energized, the semicircular glass plate 51 is rotated about the central axis of the annular holder 52.

As illustrated in FIG. 14, the optical path changer 50 is inserted in the optical path between the LCD panel 10 and the eyepiece 31 such that the plane of the semicircular glass plate 51 is inclined to the optical axis of the eyepiece 31.

During a first half of the full revolution of the optical path changer 50 by the motor 56, the bypass region 54 thereof is positioned in the optical path between the LCD panel 10 and the eyepiece 31. During a latter half of the full revolution of the optical path changer 50, the semicircular glass plate 51 is obliquely inserted in the optical path between the LCD panel 10 and the eyepiece 31.

The principles of an optical pixel shift by the optical path changer 50 will be described below with reference to FIG. 14.

It is assumed that the plane of the semicircular glass plate 51 is inclined an angle θ to a direction perpendicular to the optical axis of the eyepiece 31, the semicircular glass plate 51 has a thickness D and a refractive index n.

When the bypass region 54 is positioned in the optical path, a ray LO of light emitted from a point PL passes straight through the optical path changer 50 as indicated by the solid line L54.

When the semicircular glass plate 51 is brought into the optical path, the ray LO of light emitted from the point PL is refracted by the semicircular glass plate 51, and the optical path is shifted downwardly in FIG. 14 as indicated by the solid line L51. Therefore, the viewer 1 observes the ray LO of light as coming from a point PLs that is shifted downwardly from the point PL by a distance x, and hence observes pixels as being shifted downwardly by the distance x.

At this time, the following equations are satisfied:

$(D*\tan\theta i - D*\tan\theta o)*\cos\theta = x$ (5), $\sin\theta i = n*\sin\theta o$ (6), $\theta = \theta i$ (7)

where θi is the incident angle at which the ray of light falls on the semicircular glass plate 51, θo the angle at which the ray of light leaves the semicircular glass plate 51, and * represents a multiplication.

The motor 57 is energized to rotate the optical path changer 50 at a constant speed to make one revolution in one frame such that the bypass region 54 is positioned in the optical path between the LCD panel 10 and the eyepiece 31 in the odd-numbered fields of a video signal VI supplied to the image display system, and the semicircular glass plate 51 is positioned in the optical path between the LCD panel 10 and the eyepiece 31 in the even-numbered fields of the video signal VI. Thus, the optical path changer 50 is rotated through one revolution per frame in synchronism with vertical scanning of the LCD panel 10.

In order to energize the motor 57 in synchronism with the supplied video signal VI, a semicircular outer circumferential surface of the annular holder 52 comprises an optically reflecting surface, and the remaining semicircular outer circumferential surface thereof comprises an optically unreflecting surface. An optical rotation phase sensor 58 positioned in confronting relation to the outer circumferential surface of the annular holder 52 comprises a light-emitting element and a light-detecting element. Light emitted from the light-emitting element is applied to the outer circumferential surface of the annular holder 52, and light reflected thereby is detected by the light-detecting element.

The optical rotation phase sensor 58 is positioned such that it faces the reflecting and non reflecting surfaces of the annular holder 52 substantially in synchronism respectively with even-numbered field intervals in which the semicircular glass plate 51 is positioned in the optical path between the LCD panel 10 and the eyepiece 31 and odd-numbered field intervals in which the bypass region 54 is positioned in the optical path between the LCD panel 10 and the eyepiece 31.

A detected output signal S58 (see FIG. 13C) from the optical rotation phase sensor 58 is supplied through an amplifier 59 to a motor driver 60.

In the motor driver 60, the output signal S58 from the optical rotation phase sensor 58 is compared with a decision signal O/E which indicates whether the present field is an odd-numbered field or an even-numbered from the supplied video signal VI (see FIG. 13A) by a phase comparator 61. A phase error signal outputted from the phase comparator 61 is supplied through a low-pass filter 62 to one input terminal of a differential amplifier 63 whose other input terminal is supplied with a reference voltage REF for establishing a reference phase. The reference voltage REF can be adjusted by a variable resistor 64.

An output signal from the differential amplifier 63, which indicates the voltage difference between the signals applied to the input terminals thereof, is supplied through a control driver 65 to the motor 57 for controlling the rotational phase thereof. A drive signal applied from the control driver 65 to the motor 57 can be adjusted in amplitude by a variable resistor 66. The control loop thus constructed operates until the output signal from the differential amplifier 63 becomes zero whereupon the rotational phase of the optical path changer 50 is synchronized with the decision signal O/E.

The direction in and the amount by which the pixels are to be optically shifted can be determined by the direction in and the angle through which the semicircular glass plate 51 is inclined with respect to the optical path.

The apparatus shown in FIGS. 12 through 14 is advantageous in that an optical pixel shift can simply be achieved by rotation of the optical path changer 50 and any vibrational noise which is produced is relatively low.

Figure 15:
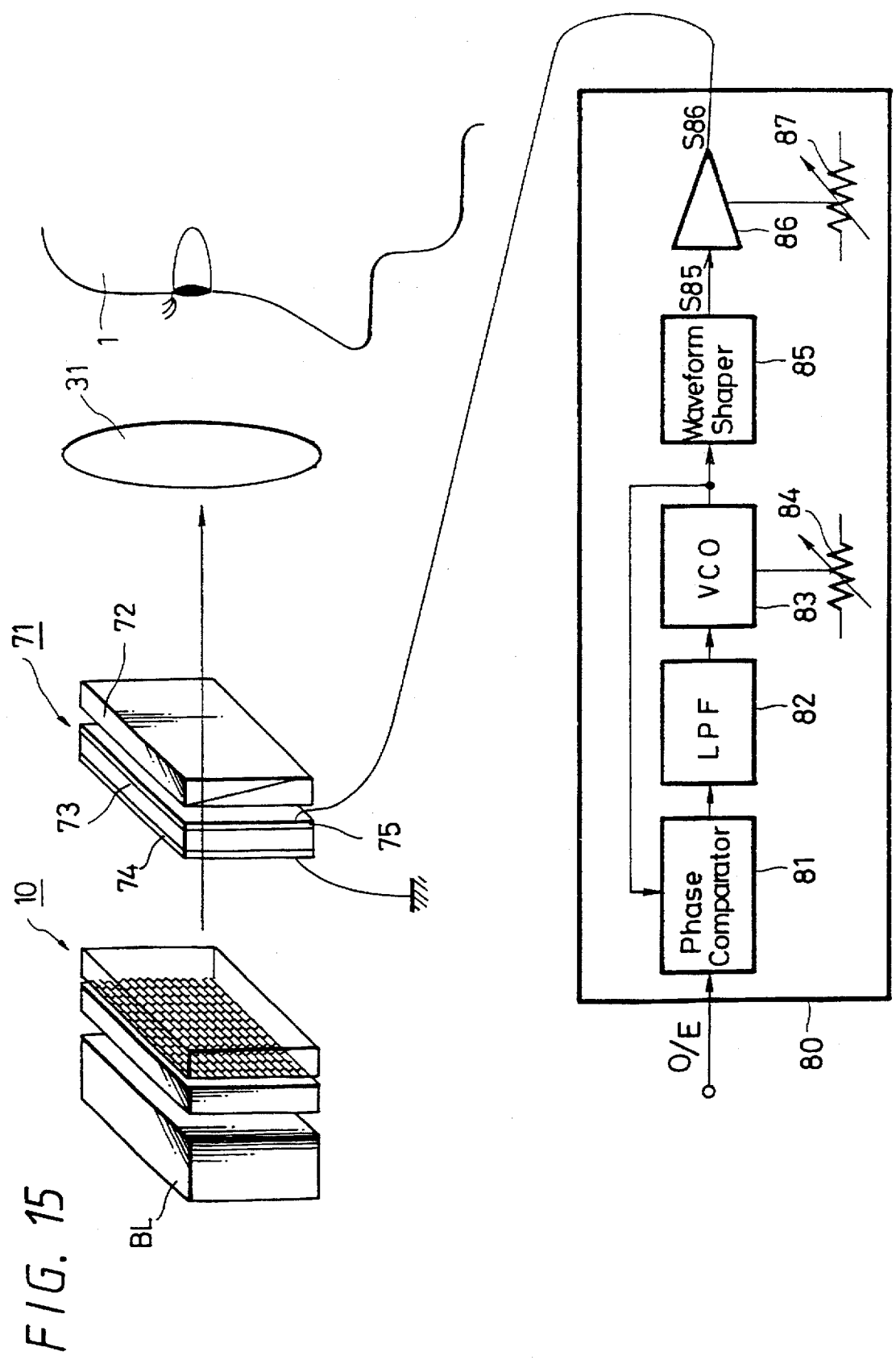
FIG. 15 is a schematic view, partly in block form, of an apparatus for increasing the resolution in an image display system according to still another embodiment of the present invention.
Figure 17:
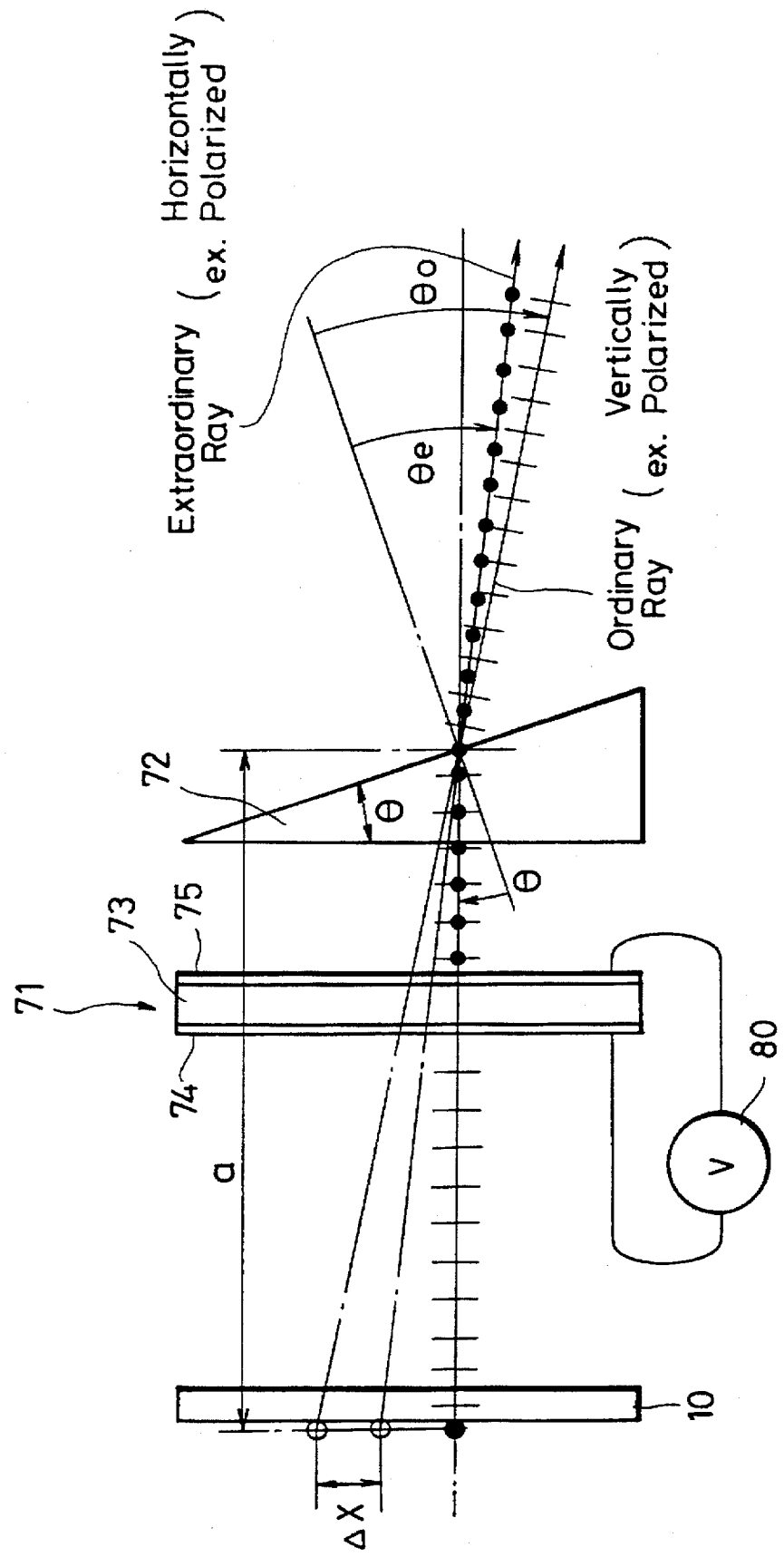
FIG. 17 is a diagram showing the principles of the changing of an optical path in the apparatus shown in FIG. 15.

FIGS. 15 through 17 show an apparatus for increasing a resolution in an image display system according to still another embodiment of the present invention. As shown in FIG. 15, the apparatus includes an optical path changer 71 comprising a polarization plane rotator 71 and a prismatic birefringent plate 72 made of a material having large birefringence such as quartz, calcite, liquid crystal, or the like.

The polarization plane rotator 71 comprises a liquid crystal panel 73 and a pair of transparent electrodes 74, 75 mounted on respective opposite surfaces of the liquid crystal panel 73. When a voltage for driving the liquid crystal is applied between the transparent electrodes 74, 75, the plane of polarization is rotated and changed in every field into conformity with the planes of polarization of ordinary and extraordinary rays of light passing through the birefringent plate 72.

If the ordinary ray of light passing through the birefringent plate 72 is vertically polarized (the plane of polarization is at 90°), for example, and the extraordinary ray of light passing through the birefringent plate 72 is horizontally polarized (the plane of polarization is at 0°), for example, then the polarization plane rotator 71 rotates the plane of polarization to either 90° or 0° in every field.

The voltage for driving the liquid crystal is generated by a driver 80. The driver 80 is identical in structure to the driver 40 shown in FIG. 5, and comprises a phase comparator 81, a low-pass filter 82, a VCO 83 associated with a phase corrector 84, a waveform shaper 85, and a control driver 86 associated with an amplitude-adjusting variable resistor 87.

The VCO 83 produces a signal S83 having the period of frames which is in phase with a decision signal O/E (see FIG. 16B) indicative of whether the present field is an odd-numbered field or an even-numbered field. The signal S83 from the VCO 83 is supplied to the waveform shaper 85, which produces a signal S85 having a different amplitude from a voltage S86 (see FIG. 16C) for driving the liquid crystal. The signal S85 is then supplied to the control driver 86 and adjusted in amplitude thereby.

The voltage S86 from the control driver 86 is applied between the transparent electrodes 74, 75 of the polarization plane rotator 71. The polarization plane rotator 71 now rotates the plane of polarization from 0° to 90° in the odd-numbered fields, for example, and from 90° to 0° in the even-numbered fields, for example.

A linearly polarized ray of light which is emitted from an LCD panel 10 is applied to the polarization plane rotator 71, and the plane of polarization thereof is rotated to either 0° or 90° in every field. Thereafter, the ray of light enters the birefringent plate 72. When the ray of light travels through the birefringent plate 72, the amount which the ray of light is deflected is changed due to the difference between the refractive indexes with respect to the ordinary and extraordinary rays of light corresponding to the planes of polarization at 0° and 90°, thus optically shifting a pixel pattern in every field.

FIG. 17 shows the principles of such an optical pixel shift. In FIG. 17, θ represents a prism angle of the birefringent plate 72, θe the angle of refraction of the extraordinary ray of light which is horizontally polarized, and θo the angle of refraction of the ordinary ray of light is vertically polarized.

When the plane of polarization of the linearly polarized ray of light from the display surface of the LCD panel 10 is changed into conformity with the planes of polarization of the ordinary and extraordinary rays of light passing through the birefringent plate 72 in every field by the polarization plane rotator 71, a ray of light from the same pixel position is refracted with different refractive indexes ne, no in each field, and reaches the viewer. As a result, the viewer observes the ray of light from the same pixel position as being emitted from a position that is shifted Δx ion every field, resulting in an optical pixel shift. At this time, the following equations are satisfied:

$$ne*\sin\theta = \sin\theta e \quad (8),$$

$$a*\tan(\theta e - \theta) = xe \quad (9),$$

$$no*\sin\theta = \sin\theta o \quad (10),$$

$$a*\tan(\theta o - \theta) = xo \quad (11),$$

$$\Delta x = xe - xo \quad (12)$$

where ne is the refractive index with respect to the extraordinary ray of light, no the refractive index with respect to the ordinary ray of light, and * represents a multiplication.

The birefringent plate 72 is not limited to a prismatic shape, but may be of the type which has a glass plate that is obliquely inserted as shown in FIG. 12, or may comprise a birefringent plate 76 for separating ordinary and extraordinary rays of light at a separation angle θ as shown in FIG. 18. In FIG. 18, the amount x of an optical pixel shift is indicated by:

$$x = d*\tan\theta$$

where d is the thickness of the birefringent plate 76.

The apparatus shown in FIGS. 12 through 18 has a high response speed, can achieve substantially ideal light deflection, and is free from mechanical noise as they deflect light electrically.

Figure 19:
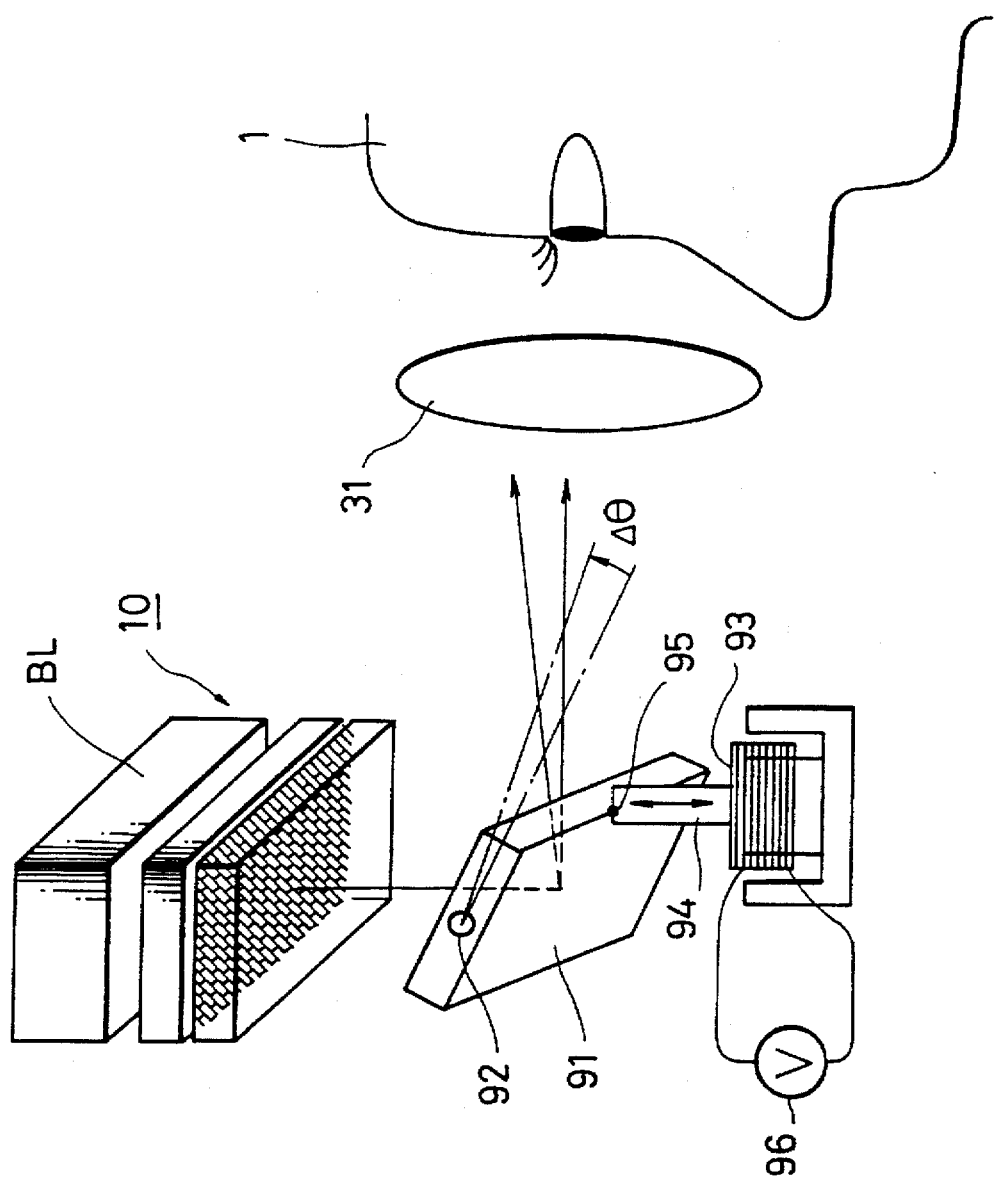
FIG. 19 is a schematic view, partly in block form, of an apparatus for increasing the resolution in an image display system according to yet still another embodiment of the present invention.

An apparatus for increasing a resolution according to yet still another embodiment of the present invention has an optical path changer in the form of a reflecting mirror as shown in FIG. 19.

As shown in FIG. 19, an LCD panel 10 is positioned above and perpendicularly to the optical axis of an eyepiece 31, and has a display surface facing downwardly. Light emitted from the display surface of the LCD panel 10 is reflected toward the eyepiece 31 along the optical axis thereof by a reflecting mirror 91.

The reflecting mirror 91 is rotatably supported on a support rod 92 which extends parallel to the LCD panel 10. As with the arrangement shown in FIG. 5, the reflecting mirror 91 is coupled through a flexible hinge 95 to an actuating rod 94 which is reciprocally movable vertically in every field by a voice coil 93. The voice coil 93 can be energized by a driver 93 which is identical in structure to the driver 40 shown in FIG. 5.

When the actuating rod 94 is moved upwardly, for example, by the voice coil 93, the reflecting mirror 91 is angularly moved an angle Δθ in the direction indicated by the arrow about the support rod 92. The optical path along which light emitted from the LCD panel 10 is now changed or shifted upwardly from the dotted-line direction to the solid-line direction, thereby effecting an optical pixel shift.

Figure 20:
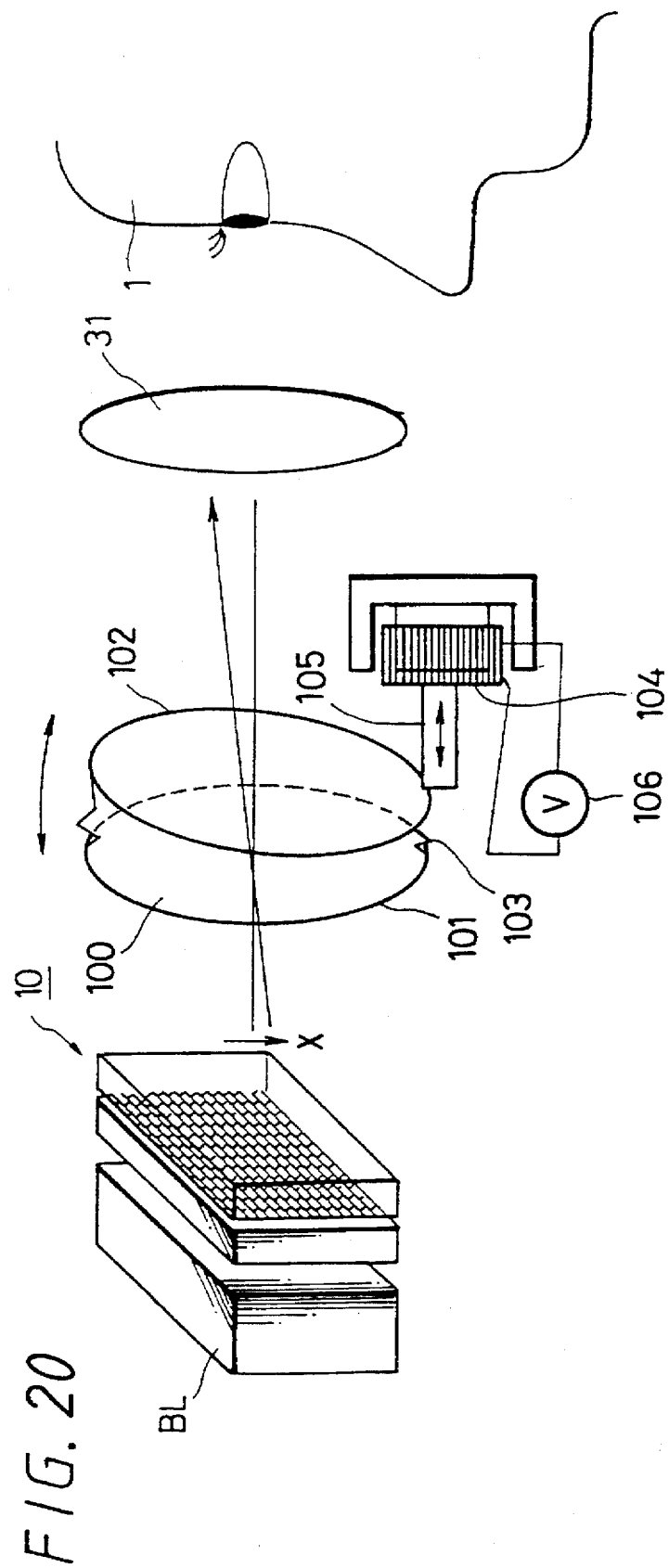
FIG. 20 is a schematic view, partly in block form, of an apparatus for increasing the resolution in an image display system according to a further embodiment of the present invention.

FIG. 20 shows an apparatus for increasing a resolution in an image display system according to a further embodiment of the present invention.

In FIG. 20, an active prism (hereinafter referred to as a "VAP") 100 for use in preventing an image from being distorted due to a camera impact on a camera-combined VTR is employed to change or shift an optical path.

As disclosed in "Nikkei Electronics" Jun. 6, 1992, No. 558, pages 203–211, the VAP 100 comprises a liquid having a high refractive index and sealed between two glass panels 101, 102 which are joined to each other by bellows 103. One or both of the glass panels 101, 102 can freely be moved vertically and horizontally.

The VAP 100 is inserted in an optical path between a LCD panel 10 and an eyepiece 31. As with the arrangement shown in FIG. 5, one of the glass panels 102 of the VAP 100 is coupled through a flexible hinge (not shown) to an actuating rod 105 which is reciprocally movable vertically in every field by a voice coil 104. The voice coil 104 can be energized by a driver 106 which is identical in structure to the driver 40 shown in FIG. 5.

When the actuating rod 105 is moved to the left, for example, by the voice coil 104, the glass panel 102 is changed in its position thereby to change or shift the optical path of light emitted from the LCD panel 10, thus effecting an optical pixel shift.

Since information that is written in pixels of a liquid crystal display panel in one field remains until a next field, information of an odd-numbered field and information of an even-numbered field exist simultaneously in one frame. With such a liquid crystal display arrangement, it is preferable to shift only one field in synchronism with vertical scanning for a desired optical pixel shift though an optical pixel shift can be achieved in about half of the frame by shifting the entire frame. One example of such an optical path changer will be described below.

FIGS. 21A through 21C show an optical path changer for use in the apparatus shown in FIG. 12.

In FIGS. 21A through 21C, an optical path changer 500 comprises seven sectorial glass plates 511 through 517, rather than the semicircular glass plate 51 shown in FIGS. 12 through 14.

The optical path changer 500 includes a plurality of circumferentially spaced partition plates radially held in an annular holder similar to the annular holder 52 shown in FIG. 12 and dividing a circular space defined by the annular holder into 14 sectorial regions. The optical path changer 500 has a joint, similar to the joint 56 shown in FIG. 12, at its center for connection to the rotatable shaft of the motor 57 (see FIG. 12). The seven sectorial glass plates 511 through 517 are fitted in every other sectorial regions in the annular holder. Those sectorial regions in which the seven sectorial glass plates 511 through 517 are not fitted serve as bypass regions 540.

The outer circumferential surface of the annular holder comprise optically reflecting and non reflecting surfaces disposed alternately in angular intervals of 360°/14.

The optical rotation phase sensor 58 (see FIG. 12) is disposed in confronting relation to the outer circumferential surface of the annular holder. A detected output signal from the rotation phase sensor 58 is supplied to the motor driver 60 (see FIG. 12).

The optical path changer 500 is obliquely inserted in the optical path between the LCD panel 10 and the viewer. The motor driver 60 controls the motor 57 such that the optical path changer 700 makes one revolution in seven frames with each of the sectorial glass plates 511 through 517 appearing in the optical path between the LCD panel 10 and the viewer in an even-numbered field, and also with each of the bypass regions 540 appearing in the optical path between the LCD panel 10 and the viewer in an odd-numbered field. In this manner, the optical path changer 500 can effect an optical pixel shift in the same manner as the apparatus shown in FIG. 12.

The direction in and the amount by which the pixels are to be optically shifted can be determined by the direction in and the angle through which the sectorial glass plates 511 through 517 are inclined with respect to the optical path.

Inasmuch as the optical path changer 500 has seven bypass regions 540 and seven sectorial glass plates 511 through 517, the optical path changer 500 makes one revolution in seven frame in synchronism with vertical scanning.

Figure 22:
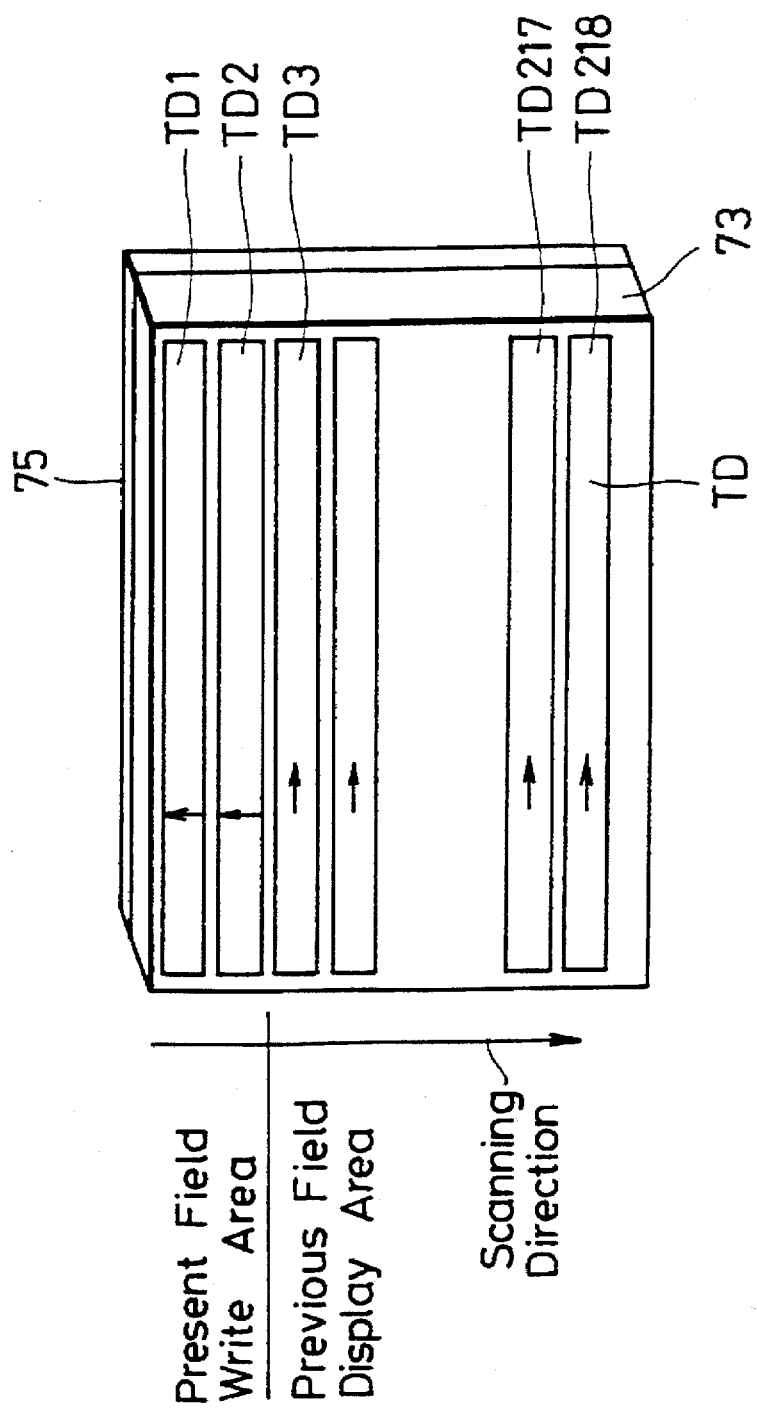
FIG. 22 is a perspective view of a polarization plane rotator for use in the apparatus shown in FIG. 15.
Figure 23:
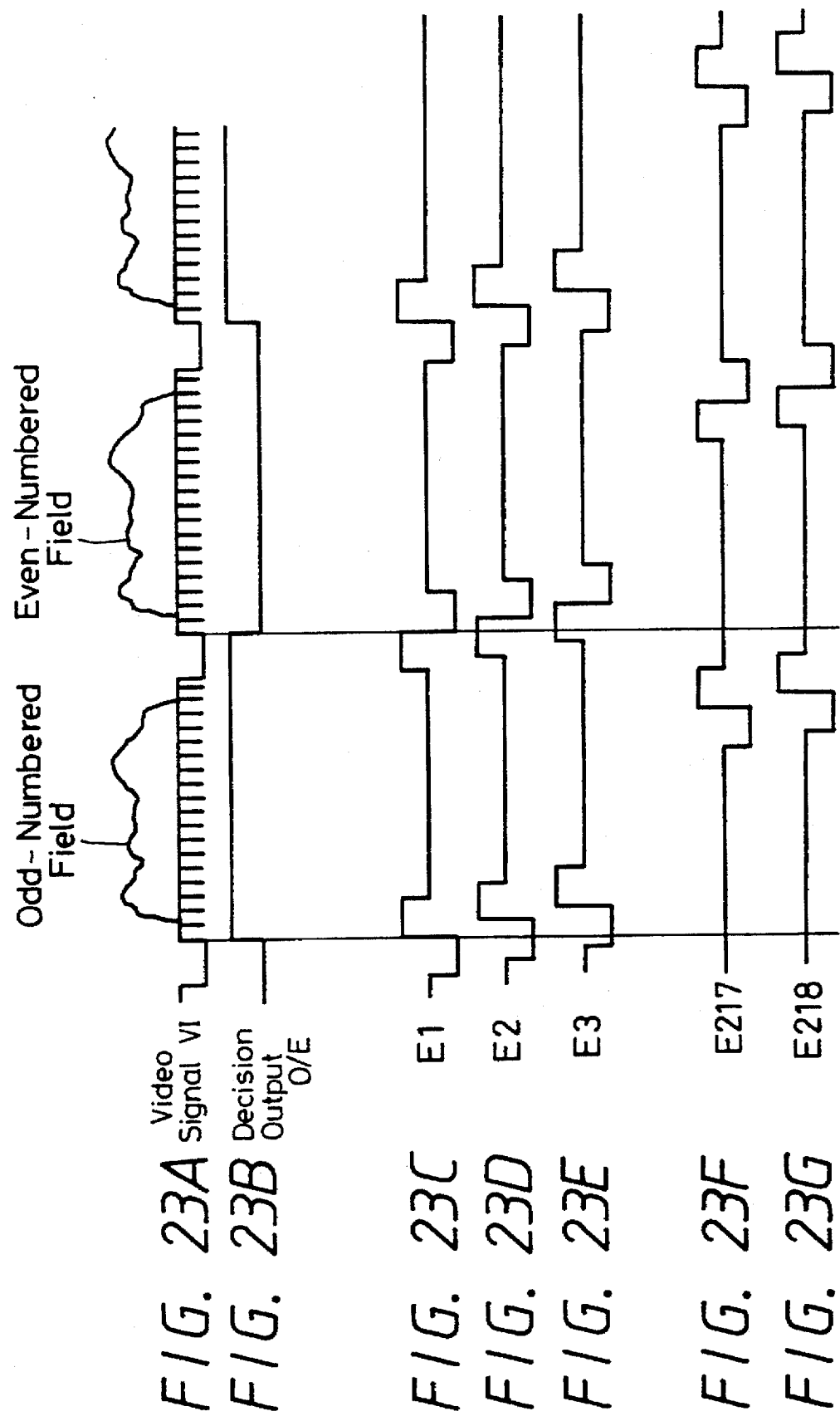
FIGS. 23A through 23G are timing charts showing the manner in which the polarization plane rotator shown in FIG. 22 operates.

FIG. 22 shows a polarization plane rotator for use in the apparatus shown in FIG. 15, the polarization plane rotator being a modification of the polarization plane rotator 71 shown in FIG. 15 and serving to shift only one field in synchronism with vertical scanning.

As shown in FIG. 22, the polarization plane rotator comprises a liquid crystal panel 73, a transparent electrode 75 mounted on one surface of the liquid crystal panel 73, and an assembly scanning-line electrodes TD (transparent electrodes) which are vertically separate so as to correspond to respective scanning lines and are of equal number as the number of scanning lines, e.g., 218 scanning lines in FIG. 22. A scanning-line voltage Ek applied between the a scanning-line electrode TDk (k is a line number: k=1, 2, .. . 218) and the transparent electrode 75 is controlled in synchronism with vertical scanning of the LCD panel 10 for vertically rotating the plane of polarization of linearly polarized light from the pixels of each scanning line from 0° to 90° or 90° to 0°. The scanning-line voltages Ek applied between the scanning-line electrodes and the transparent electrode 75 are shown in FIGS. 23C through 23G.

In FIG. 22, the first and second scanning-line electrodes TD1, TD2 serve as an area for writing a present field therein, and the plane of polarization of light passing therethrough is at 90°. The third scanning-line electrode TD3 and other scanning-line electrodes positioned therebelow serve as an area for displaying a previous field, and the plane of polarization of light passing therethrough is at 0°.

Since an optical pixel shift can be achieved in about half of the frame by shifting the entire frame, one of the transparent electrodes of the polarization plane rotator may not be divided into areas corresponding to the scanning areas, but may be divided into areas corresponding to groups of the scanning lines.

Figure 24:
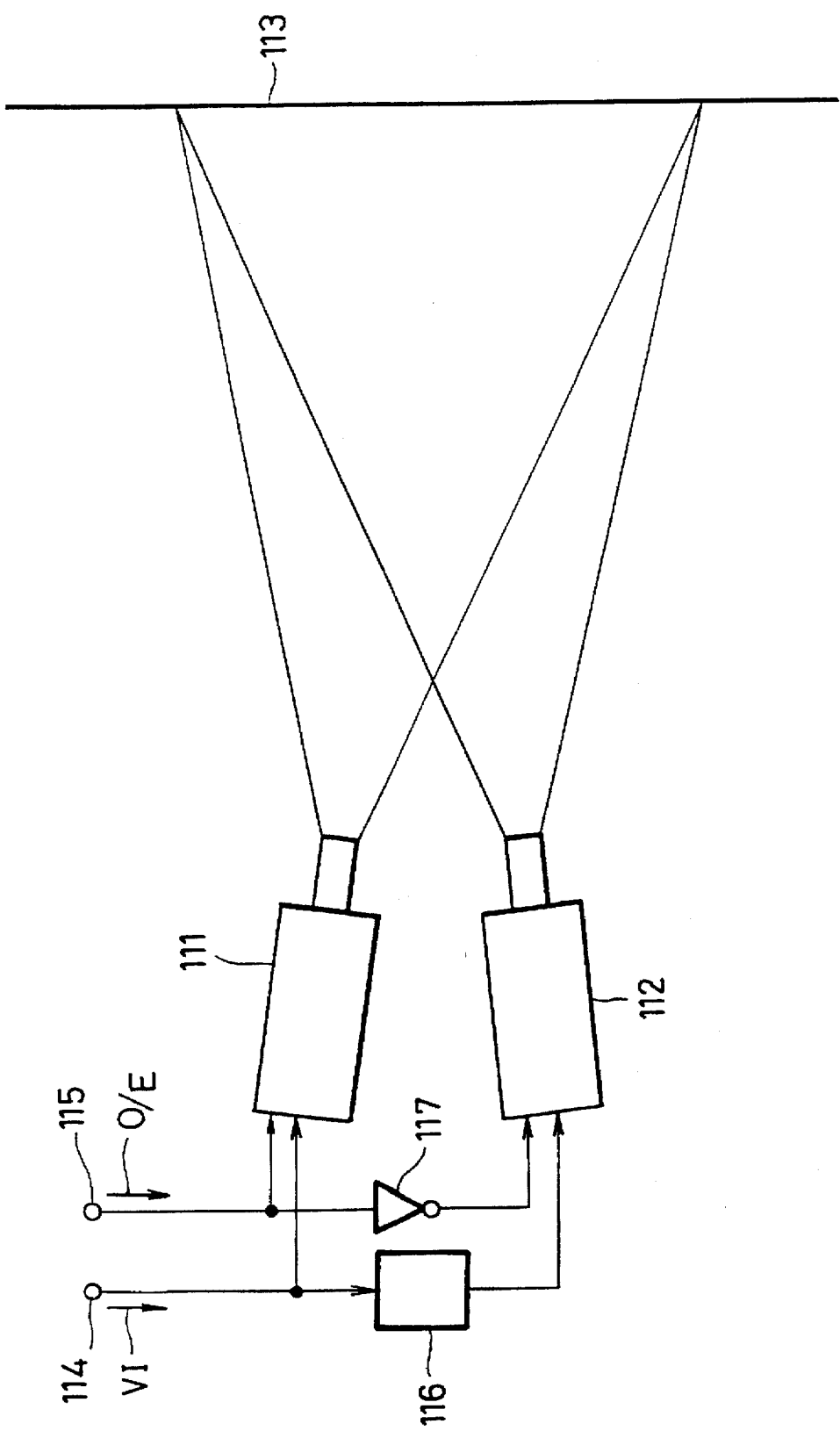
FIG. 24 is a schematic view, partly in block form, of an apparatus for increasing the resolution in an image display system according to a still further embodiment of the present invention.

FIG. 24 shows an apparatus for increasing a resolution in an image display system according to a still further embodiment of the present invention. In FIG. 24, two projectors each having an LCD panel as an image display surface are employed to optically increase the number of pixels displayed.

As shown in FIG. 24, two projectors 111, 112 are directed such that an image projected by the projector 111 and an image projected by the projector 112 are superimposed on a screen 113. Each of the projectors 111, 112 has an LCD panel as shown in FIG. 6 and projects an image displayed on the LCD panel onto the screen 113.

A color video signal VI (see FIG. 25A) is supplied from an input terminal 114 to the projectors 111, 112. In each of the projectors 111, 112, the supplied color video signal VI is decoded into three-primary signals that are then supplied to the LCD panel. For optically shifting the pixels horizontally, a delay circuit 116 for delaying the supplied color video signal by an amount corresponding to the shift of the pixels is inserted in a video signal line connected to the projector 112.

A decision signal O/E which indicates whether the present field is an odd-numbered field or an even-numbered field of the color video signal VI is supplied as a vertical enable signal VEN to the projector 111. The decision signal O/E is inverted by an inverter 117, and supplied as a vertical enable signal VEN to the projector 112.

In each of the projectors 111, 112, the LCD panel writes image information in the pixels when the vertical enable signal VEN is of an "H" level, and holds the written image information when the vertical enable signal VEN is of an "L" level (LCD noiseless mode).

Therefore, the projector 111 displays only odd-numbered fields (see FIG. 25B) and the projector 112 displays only even-numbered fields (see FIG. 25C). If the image projected by the projector 111 is as shown in FIG. 1A, 2A, 3A, or 4A, and the image projected by the projector 112 is as shown in FIG. 1B, 2B, 3B, or 4B, then the combined image displayed on the screen 113 is as shown in FIG. 1C, 2C, 3C, or 4C.

Use of the two projectors 111, 112 doubles the brightness of the combined image displayed on the screen 113.

If an image signal for a left eye is supplied as odd-numbered fields to the projector 111 and an image signal for a right eye is supplied as even-numbered fields to the projector 112, and the planes of polarization of rays of light that are projected by the respective projectors 111, 112 lie perpendicularly to each other, then a three-dimensional image can be observed on the screen 113 by the viewer using polarized glasses.

Figure 26:
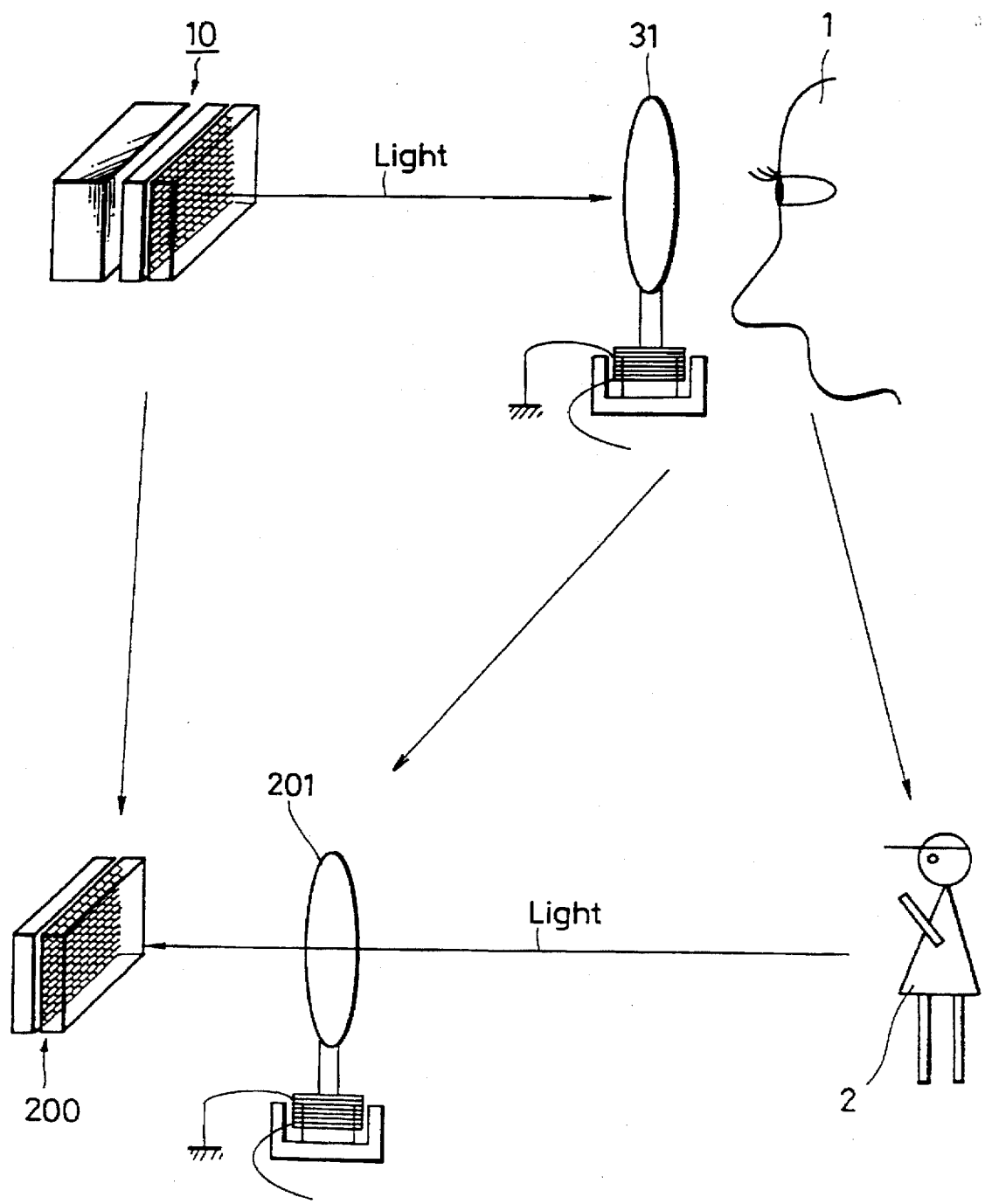
FIG. 26 is a schematic view of an imaging apparatus according to an embodiment of the present invention.
Figure 27:
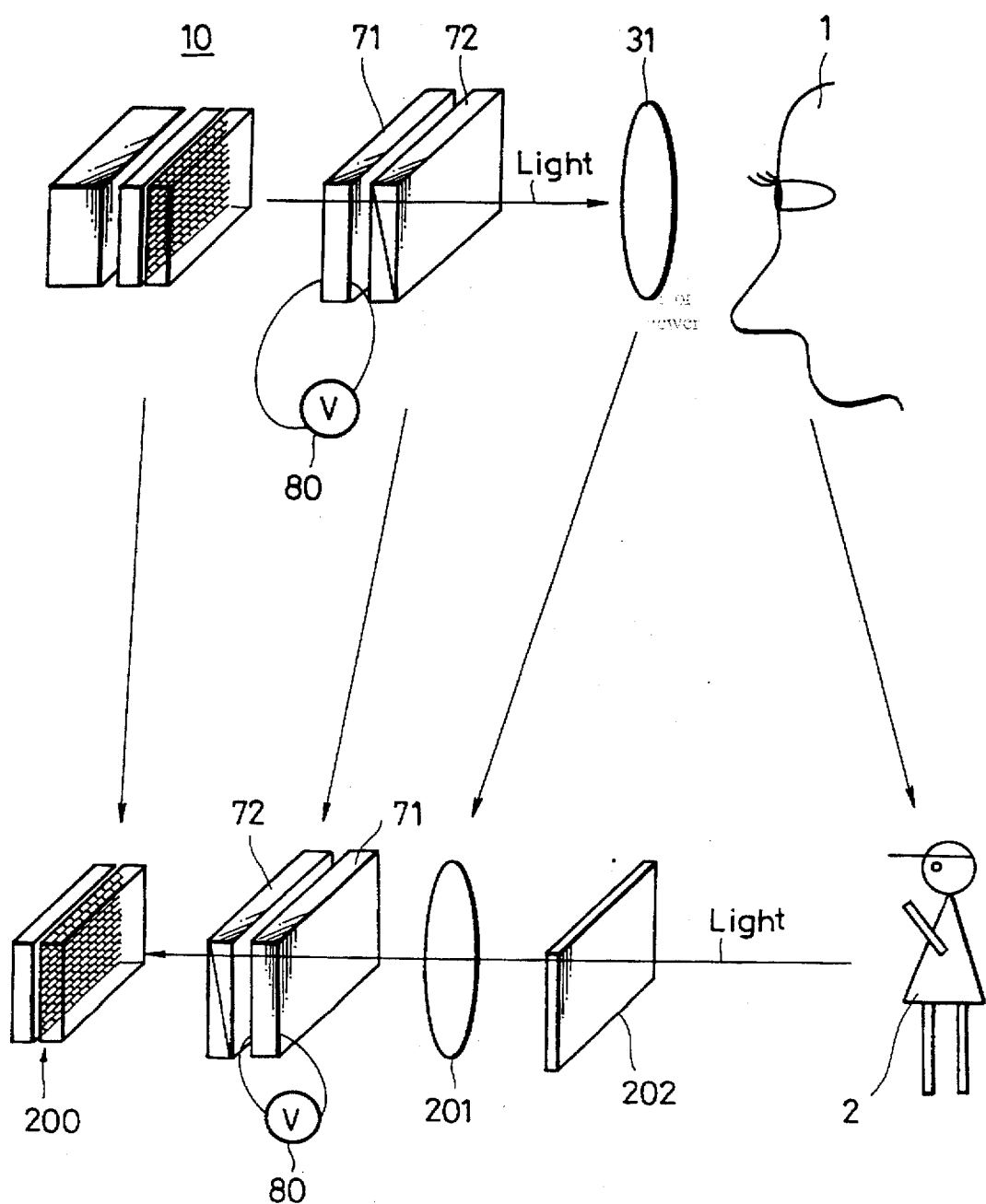
FIG. 27 is a schematic view of an imaging apparatus according to another embodiment of the present invention.

As shown in FIGS. 26 and 27, the LCD panel 10 may be replaced with a CCD imaging unit 200, the viewer 1 with a subject 2, and the eyepiece 31 with an objective 201, with light traveling in the opposite direction, and the optical path may be changed or shifted in the manner described above, for increasing the resolution of an image that is produced by an imaging apparatus such as a CCD camera.

FIG. 26 shows a CCD camera which corresponds to the arrangement shown in FIG. 5.

FIG. 27 shows a CCD camera which corresponds to the arrangement shown in FIGS. 15 through 17.

In the CCD camera shown in FIG. 27, the polarization plane rotator 71 and the birefringent plate 72 are switched around because the light travels in the opposite direction.

If no space is available between the objective 201 and the CCD imaging unit 200 in FIG. 27, then the polarization plane rotator 71 and the birefringent plate 72 may be positioned between the objective 2 and the objective 201.

In ordinary CCD cameras, the number of pixels of the CCD imaging unit is selected to match the interlaced scanning of video signals. Therefore, all the pixels of the CCD imaging unit may be handled as the pixels of one field, and the pixels may be optically shifted vertically in the manner described above to apparently make the number of horizontal scanning lines twice that of NTSC signals, thereby producing an image signal according to high-definition television (HDTV) standards.

Still images which are not required to be shifted in every field may be processed using an optical deflector such as a VAP.

Still images having a high resolution may be outputted using a printer or displayed on a HDTV monitor.

Figure 28:
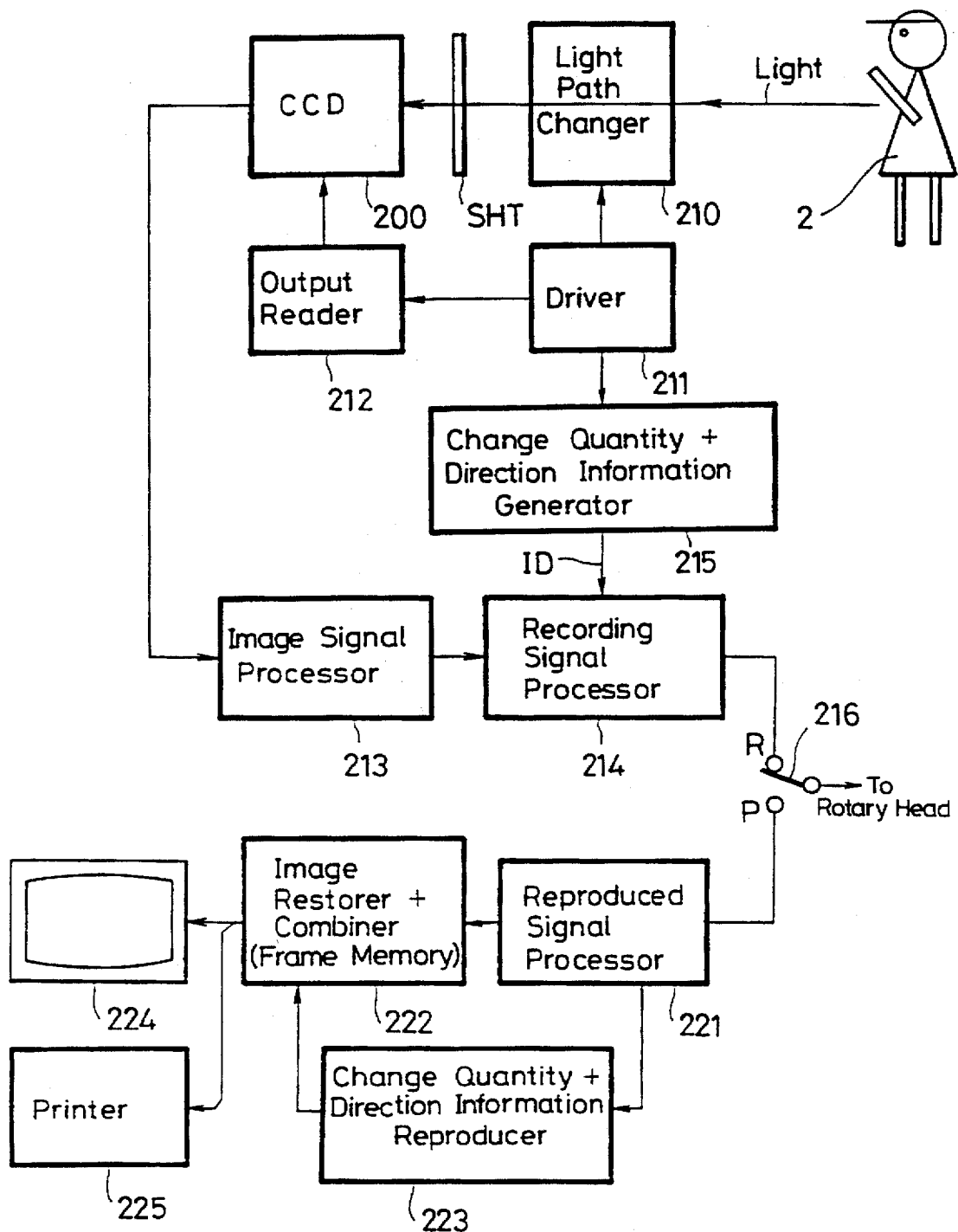
FIG. 28 is a block diagram of a recording and reproducing apparatus according to the present invention.

FIG. 28 shows, in block form, a recording and reproducing apparatus according to the present invention, with a camera combined therewith. The recording and reproducing apparatus can record still images of high resolution with a CCD camera shown in FIG. 26 or 27 and also reproduce recorded still images.

The optical path of light from a subject 2 is optically shifted vertically and/or horizontally a predetermined amount in synchronism with a field or a frame by an optical path changer, and then the light is applied to a CCD imaging unit 200.

A shutter mechanism SHT is disposed between the CCD imaging unit 200 and the subject 2. The shutter mechanism SHT is opened during at least one cycle of an optical path shift because the recording and reproducing apparatus shown in FIG. 28 produces a combined high-resolution still image by combining field images of a subject (still image) that are sampled at spatially different positions by the optical path charger 210.

The optical path is shifted by the optical path changer 210 in a direction and by an amount depending on a drive signal applied from a driver 211 to the optical path changer 210.

The CCD imaging unit 200 generates an image signal that is outputted in response to a timing signal from an output reader 212. The output reader 212 is supplied with a shift timing signal from the driver 211 such that the image signal is read from the CCD imaging unit 200 in synchronism with the shifting of the optical path.

The image signal from the CCD imaging unit 200 is supplied to an image signal processor 213, which processes the image signal into a color video signal supplied to a recording signal processor 214. The recording signal processor 214 processes, e.g., modulates, the color video signal.

A change quantity and direction information generator 215 produces information ID representing the quantity and direction of an optical path shift effected by the optical path changer 210, based on a signal from the driver 211, and supplies the information ID to the recording signal processor 214. The information ID also contains information indicative of now many field images are to be combined into a combined high-resolution still image.

The recording signal processor 214 inserts or adds the information ID in or to a period of the video signal, such as a vertical blanking period of a color video signal to be recorded, other than a main signal interval. An output signal from the recording signal processor 214 is supplied through a recording contact R of a recording/playback selector switch 216 to a rotary head, which records the signal on a magnetic tape.

A recorded signal is reproduced as follows:

A signal reproduced from the magnetic tape by the rotary head is supplied through a reproducing contact P of the recording/playback selector switch 216 to a reproduced signal processor 221.

The reproduced signal processor 221 demodulates a color video signal from the reproduced signal, and supplies the demodulated color video signal to an image restorer and combiner 222. The reproduced signal processor 221 also extracts information ID from the reproduced signal, and supplies the extracted information ID to a change quantity and direction information reproducer 223. The change quantity and direction information reproducer 223 reproduces information representing the number of field images to be combined into a single still image and the quantity and direction of an optical path shift of each of the field images, and supplies the reproduced information to the image restorer and combiner 222.

The image restorer and combiner 222 has a frame memory which stores a digital color video signal that has been converted from the analog color video signal from the reproduced signal processor 221. The digital color video signal read from the frame memory of the image restorer and combiner 222 is converted into an analog color video signal, which is supplied to a display monitor 224 or a printer 225. The printer 225 may be supplied with the digital color video signal directly.

The frame memory of the image restorer and combinet 222 comprises a memory that can store more pixels than the pixels that are sampled in the analog-to-digital and digital-to-analog conversions per field. Stated otherwise, the frame memory is capable of storing a number of pixels corresponding to the maximum number of field images that are to be combined with each other.

Based on the information as to the quantity and direction of an optical path shift from the change quantity and direction information reproducer 223, the image restorer and combiner 222 writes each of the field images which will constitute a still image into the frame memory so as to correspond to their spatially sampled positions at the time the field image is produced. As a consequence, the frame memory stores the information of a still image having a greater resolution than the resolution of the CCD imaging unit 200.

As described above, the still image information stored in the frame memory is converted into analog information, which is supplied to the display monitor 224 for display or to the printer 225 for printout as a hard copy. If the display monitor 224 or the printer 225 can display or print high-resolution images, then a still image of high resolution can be displayed or printed. If the display monitor 224 or the printer 225 is of low resolution, then the still image information stored in the frame memory is decimated and supplied to the display monitor 224 or the printer 225.

The recording and reproducing apparatus shown in FIG. 28 employs an interlaced-scanning full-line imaging unit as the CCD imaging unit 200, and combines a plurality of field images that have been produced by effecting an optical path shift horizontally and vertically into a still image of high resolution. If the optical path shift is carried out in smaller steps in the horizontal and vertical directions, thus producing more field images to be combined, the number of pixels is increased by the number of field images to be combined, so that a combined still image having a resolution that is more than twice that of ordinary interlaced-scanning images can be produced.

While the recording and reproducing apparatus is shown in FIG. 28, it may be divided into an imaging and recording apparatus and a reproducing apparatus which are separate from each other. The image signal from the recording signal processor 214 may be recorded on not only the magnetic tape but also an optical disk, an IC memory, an IC card, or any of various other information storage mediums.

The information ID representing an optical path shift may be recorded in a recording area separate from the video signal in relation thereto, rather than being added to the vertical blanking interval of the video signal.

With the present invention, as described above, an optical path between an image display panel and the viewer or screen is changed or shifted in every field of a video signal by optically deflecting or shifting pixels, and the image display panel displays images that are shifted due to the optically shifted pixels. Noninterlaced full-line images can be displayed and observed for higher resolution without having to increase the number of pixels of the image display panel.

Since the number of pixels of the image display panel is not increased, the vignetting factor thereof is not lowered, and hence the image display panel can display images with high brightness. In addition, high-resolution images can be displayed on inexpensive image display panels having a relatively small number of pixels.

Inasmuch as the apparent number of pixels of an image display panel can optically be increased horizontally as well as vertically, the total number of pixels may be four or more times the number of original pixels of the image display panel.

If the principles of the present invention are applied to an image display system having a number of pixels capable of displaying NTSC video signals according to the noninterlaced scanning process, then it can display an image based on a HDTV signal characterized by 1125 scanning lines.

The present invention which allows high-resolution images to be displayed on inexpensive image display panels is applicable to a wide variety of display devices including an electronic viewfinder for an imaging camera, a projector, a glass-type monitor, etc.

The method of increasing the resolution of an image according to the present invention can be employed in an imaging camera or the like.

Figure 21:
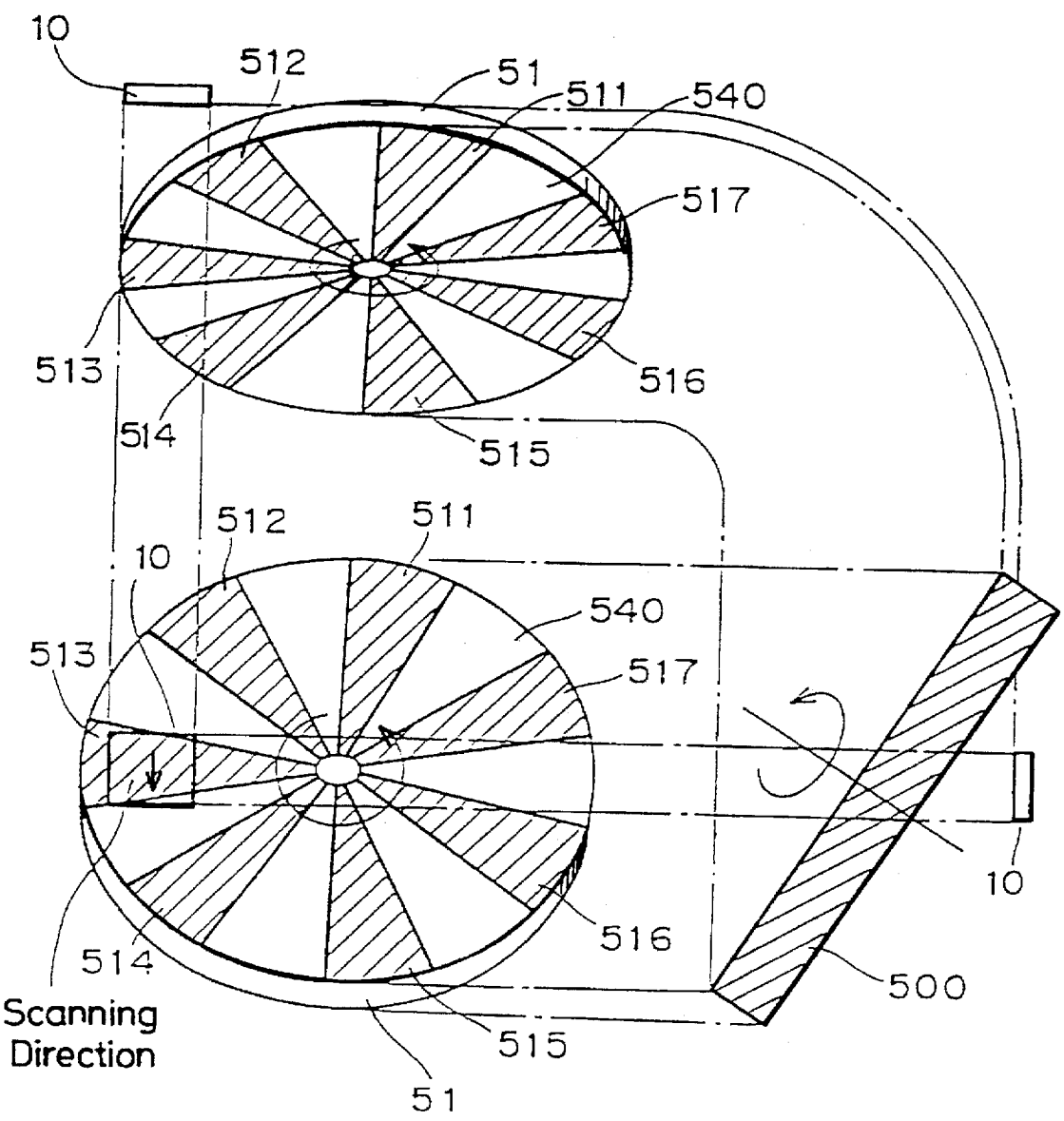
FIGS. 21A through 21C are plan, front elevational, and side elevational views, respectively, of an optical path changer for use in the apparatus shown in FIG. 12.

The arrangements shown in FIGS. 12 and 21 can achieve an optical path shift simply by effecting rotational movements without producing large vibrational noise.

The arrangements shown in FIGS. 15 and 22 have a high response speed, can achieve substantially ideal light deflection, and is free from mechanical noise as they deflect light electrically.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of increasing resolution of an image displayed to a viewer on an image display system having a matrix of pixels arranged in horizontal rows and vertical columns and selectively energizable to display an image composed of a plurality of pixel patterns in alternate fields, comprising the steps of:

providing an optical path changer formed of a light refractive member;

positioning the optical path changer between the image display system and the viewer so that the viewer views the image through the optical path changer and for shifting the optical path between the display system and the viewer to optically shift a pixel pattern;

operating said optical path changer to shift said optical path by refraction; and displaying the pixel pattern on said image display system to be shifted in every field in synchronism with the shifting of said optical path by said optical path changer by shifting a horizontal clock signal of said image display system out of phase with a horizontal synchronizing signal of image information supplied thereto in conformity with sampled positions on the displayed image when the optical path is shifted horizontally, and shifting a vertical clock signal of said image display system out of phase with a vertical synchronizing signal of image information supplied thereto in conformity with sampled positions on the displayed image when the optical path is shifted vertically.

2. A method according to claim 1, wherein said optical path is shifted vertically by ½ of the pitch of the pixels and horizontally by ¼ of the pitch of pixels of the same color.

3. A method according to claim 1, wherein said step of operating the optical path changer comprises the step of moving said light refractive member into and out of said optical path thereby shifting the optical path.

4. A method according to claim 1, wherein said light refractive member includes regions having different refractive indices, and said step of operating the optical path changer comprises the step of moving one of said regions into said optical path in alternated fields thereby shifting the optical path.

5. A method according to claim 1, wherein said optical path changer comprises an active prism for passing light from said image display system therethrough, said step of operating the optical path changer comprising the step of actuating said active prism in every field thereby shifting the optical path.

6. An image display system comprising:

an image display device receiving image information and having a matrix of pixels arranged in horizontal rows and vertical columns and selectively energizable in response to a horizontal clock signal and a vertical clock signal to display an image composed of a plurality of pixel patterns in alternate fields;

an optical path changer formed of a light refractive member disposed between said image display device and a viewer so that the viewer views a displayed image on said image display device through the optical path changer and for shifting the optical path between said image display device and the viewer and to optically shift pixel patterns; and shifting means for shifting pixel patterns displayed on said image display device in time relation to the change of the optical path by said optical path changer by shifting said horizontal clock signal in every field out of phase with a horizontal synchronizing signal of the image information supplied to said image display device in conformity with sampled positions on the displayed image when the optical path is shifted horizontally by said optical path changer and/or shifting said vertical clock signal in every field out of phase with a vertical synchronizing signal of the image information in conformity with sampled positions on the displayed image when the optical path is shifted vertically by said optical path changer.

7. An image display system according to claim 6, wherein said optical path changer comprises a circular member having a rotatable shaft located at a central axis thereof and including circumferentially alternate regions for deflecting the optical path by respective different quantities, said circular member being disposed posed in the optical path between said image display device and the viewer, whereby said rotatable shaft is rotated in synchronism with vertical scanning of said image display device to cause said circumferentially alternate regions of the circular member to move alternately into said optical path while each field of image information is supplied to said image display device.

8. An image display system according to claim 6, wherein said image display device comprises:

horizontal scanning means for successively scanning the horizontal rows, of pixels with the horizontal clock signal;

vertical scanning means for successively scanning the vertical columns of pixels with the vertical clock signal;

generating means for generating said horizontal clock signal; and generating means for generating said vertical clock signal.

9. An image display system according to claim 6, wherein said optical path changer comprises a polarization plane rotator and a birefringent plate, said polarization plane rotator and said birefringent plate being arranged between said image display device and the viewer such that light from said image display device passes successively through said polarization plane rotator and said birefringent plate in the order named.

10. A method of increasing resolution of an image displayed to a viewer on an image display system having a matrix of pixels arranged in horizontal rows and vertical columns and selectively energizable to display an image composed of a plurality of pixel patterns in alternate fields, said pixels being capable of continuously displaying the image until a next portion of image information of which a next field is composed is supplied to the pixels, comprising the steps of:

providing an optical path changer;

positioning the optical path changer between an image display system and the viewer for selectively shifting an optical path between the image display system and the viewer depending on the field, said shifting being in synchronism with vertical scanning of said image display system;

operating said optical path changer to shift said optical path; and displaying the pixel pattern to be electrically shifted on said image display system in every field in synchronism with the shifting of said optical path by said optical path changer by shifting a horizontal clock signal of said image display system out of phase with a horizontal synchronizing signal of image information supplied thereto in conformity with sampled positions on the displayed image when the optical path is shifted horizontally, and shifting a vertical clock signal of said image display system out of phase with a vertical synchronizing signal of image information supplied thereto in conformity with sampled positions on the displayed image when the optical path is shifted vertically.

* * * * *

UNITED STATES PATENT AND TRADEMARK OFFICE
CERTIFICATE OF CORRECTION

PATENT NO. : 5,689,283
DATED : November 18, 1997
INVENTOR(S) : Yoshiki Shirochi

It is certified that error appears in the above-identified patent and that said Letter Patent is hereby corrected as shown below:

Col.3, line 28, after "therebetween" insert --,--
Col.4, line 18, change "a" to --the--
Col.5, line 17, delete "and"
      same line, after "when" insert --the--
      lines 41 & 42, change "optionally" to --optically
Col.6, line 58, delete "in"
      line 59, after "of" insert --an--
Col.7, line 15, change "lit" to --11T--
Col.10, line 46, delete "as converted"

Col.14, line 2, change "ion" to --in--
Col.16, line 13, after "assembly" insert --of--
Col.17, line 56, change "Of" to --of--
      line 62, after "changer" insert --210--
Col.18, line 4, change "charger" to --changer--
      line 61, change "combinet" to --combiner--

Col.21, line 38, delete "posed"
      line 48, delete ","

Signed and Sealed this

Twenty-fourth Day of November, 1998

BRUCE LEHMAN

Attest:

Attesting Officer

Commissioner of Patents and Trademarks